US011010974B2

(12) United States Patent
Lashmar et al.

(10) Patent No.: US 11,010,974 B2
(45) Date of Patent: May 18, 2021

(54) AUGMENTED REALITY IN-APPLICATION ADVERTISEMENTS

(71) Applicant: Vungle, Inc., San Francisco, CA (US)

(72) Inventors: James Lashmar, London (GB); Helen Maxwell, London (GB); Justin Nield, London (GB); Gavin McNicholl, London (GB); Matthew John Cotton, Surrey (GB); Simon John Crowhurst, London (GB); Brett King, Bexley (GB)

(73) Assignee: Vungle, Inc., San Francisco, CA (US)

( * ) Notice: Subject to any disclaimer, the term of this patent is extended or adjusted under 35 U.S.C. 154(b) by 217 days.

(21) Appl. No.: 16/240,423

(22) Filed: Jan. 4, 2019

(65) Prior Publication Data

US 2020/0219319 A1 Jul. 9, 2020

(51) Int. Cl.
*G06Q 30/02* (2012.01)
*G06T 19/00* (2011.01)
*G06F 3/0481* (2013.01)
*H04L 29/06* (2006.01)

(52) U.S. Cl.
CPC ........ *G06T 19/006* (2013.01); *G06F 3/04815* (2013.01); *G06Q 30/0267* (2013.01); *G06Q 30/0269* (2013.01); *H04L 63/10* (2013.01)

(58) Field of Classification Search
CPC ........... G06Q 30/0267; G06Q 30/0269; G06Q 30/0271
See application file for complete search history.

(56) References Cited

U.S. PATENT DOCUMENTS 9,679,144 B2 * 6/2017 Molnar ................. G06F 21/629
2018/0349946 A1 * 12/2018 Nguyen ............. G06Q 30/0244

* cited by examiner

*Primary Examiner* — Azam A Ansari
(74) *Attorney, Agent, or Firm* — Athorus, PLLC

(57) ABSTRACT

Described are systems and methods for dynamically generating advertisements for presentation in an application executing on a client device, such as an application executing on a smart phone or tablet of a user. The described systems and methods select content items of specific content types based on determined user preference for content types as well as the device capabilities and access permissions of the application through which the advertisement is to be presented.

20 Claims, 14 Drawing Sheets

AUGMENTED REALITY IN-APPLICATION ADVERTISEMENTS

BACKGROUND

With the continued increase in mobile device usage and the availability to digital content, advertising is shifting from generic print advertising to user specific and targeted digital advertising. However, this shift has resulted in advertisers having more difficulty developing targeted advertisements for the wide variety of consumers and their preferences. Likewise, consumers have become more inundated with advertisements, making it even more difficult for advertisements to stand out and be engaging to the consumers.

DETAILED DESCRIPTION

Figure 1:
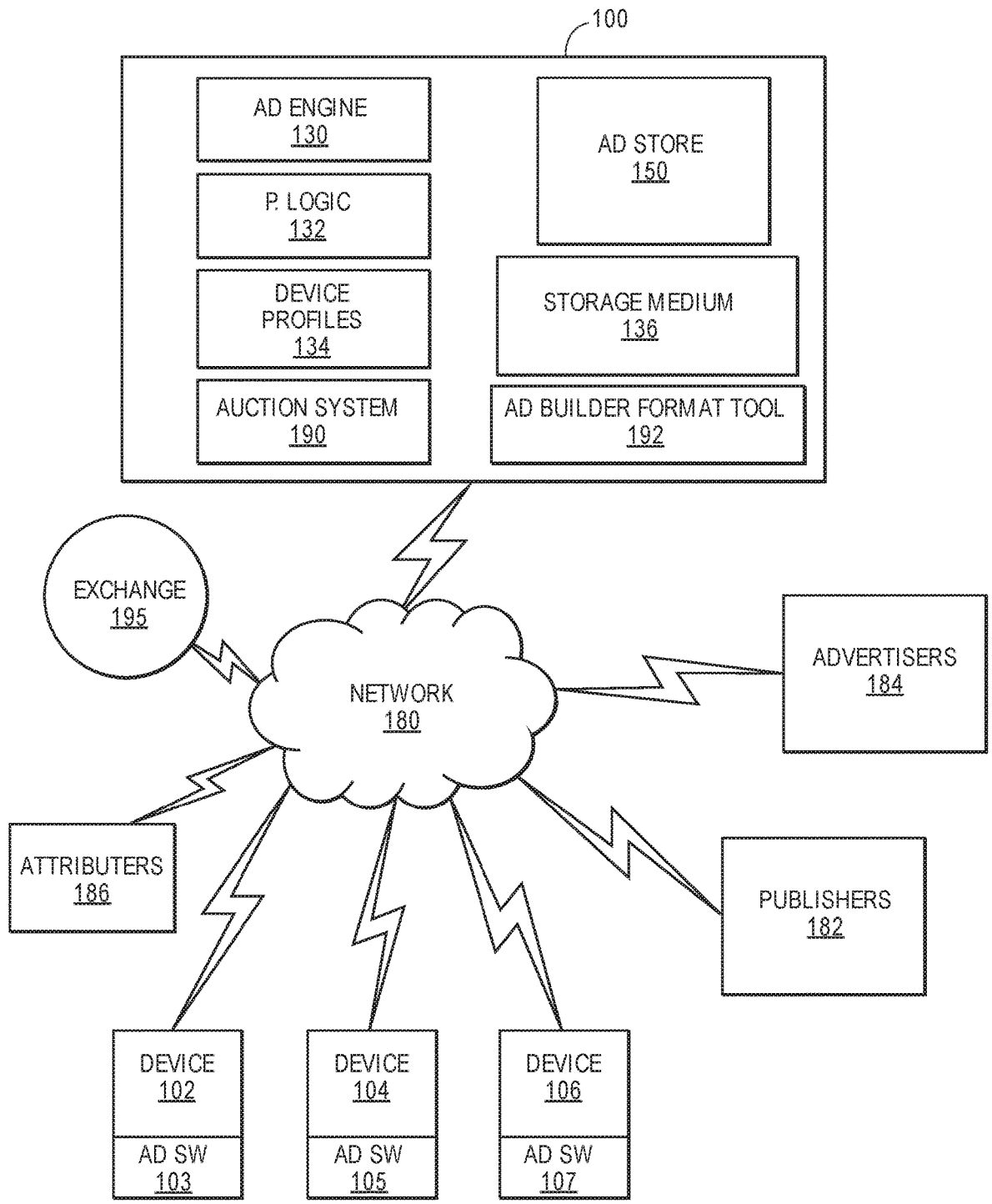
FIG. 1 is a block diagram of a system for communicating with client devices, publishers, and advertisers, in accordance with described implementations.

Methods and systems are described for generating and delivering interactive augmented reality ("AR") advertisements for presentation in an application executing on a client device, such as an application executing on a smart phone or tablet associated with a user. The advertising server system (referred to herein as an "ad server system") provides various advertising templates ("ad templates"), each of which may include one or more tokens at different locations within the ad templates. Depending on the device characteristics, application genre, advertisement genre, etc., an advertisement template may be selected for use in creating an advertisement, such as an AR advertisement. In other examples, user preferences and/or device component access permissions of the device through which the advertisement is to be presented, may be used in addition to or as alternative to other criteria for the selection of an advertisement template and/or different content types to be utilized in the different locations of a selected advertising template. For example, if the device is capable of rendering AR content and the user associated with the device or executing application prefers AR content and/or has previously requested AR content, an advertisement may be generated and delivered that includes an interactive AR component at one of the locations. In comparison, if the device is not AR capable, the application through which the advertisement is to be presented does not have access to AR components of the client device and/or the user does not prefer AR content, a non-AR advertisement may be generated and sent to the device for presentation.

In some implementations, one or more device characteristics may also be considered in determining whether to present an AR advertisement. For example, it may be determined that an AR advertisement should only be delivered to a client device when the client device has more than thirty-percent remaining power and/or is connected to a Wi-Fi network, etc. Any of a variety or number of characteristics may be considered.

Augmented reality (AR), also known as mixed reality or computer-mediated reality, refers to the interactive experience of a real-world environment in which objects in the real-world are augmented by computer generated information, referred to herein as AR content or AR information. AR information may include or be any one or more of audible, visual, haptic, somatosensory, or olfactory. In addition, the AR information may be additive to the real-world environment, referred to herein as constructive AR information, masking of the real-world environment, referred to herein as destructive AR information, or any combination of constructive AR information and destructive AR information.

By determining current device characteristics, and optionally user preferences, the appropriate type of advertisements may be dynamically generated and sent to client devices for presentation, thereby increasing the potential for user interaction with the advertisement. Moreover, with the described implementations, advertisers are able to produce multiple different advertisements with limited input and/or time. In addition, as those advertisements are dynamically created and presented, feedback is received regarding actual user engagement. The received information may be utilized to promote creation and presentation of some advertisements and/or advertisement types more frequently than other advertisements and/or advertisement types.

As discussed further below, in some implementations, machine learning models may be developed for user types and utilized to aid in the determination of advertisement type creation. In addition, engagement feedback representative of actual user engagement may be received by the ad server system and utilized to update the models. By continually updating the models, future predictions and advertisement placements will be further enhanced.

As used herein, "advertisers" include, but are not limited to, organizations that pay for advertising services including ads on a publisher network of applications and games. "Publishers" provide content for users. Publishers include, but are not limited to, developers of software applications, mobile applications, news content, gaming applications, sports news, etc. In some instances, publishers generate revenue through selling ad space in applications so that advertisers can present advertisements in those applications to users as the users interact with the application.

Advertisement performance can be defined in terms of click-through rates (CTR), conversion rates, and/or advertisement completion rates. The process in which a user selects an advertisement is referred to as a click-through, which is intended to encompass any user selection of the advertisement. The ratio of a number of click-throughs to a number of times an advertisement is displayed is referred to as the CTR of the ad. A conversion of an advertisement occurs when a user performs a transaction related to a previously viewed advertisement. For example, a conversion may occur when a user views an advertisement and installs, within a defined period of time, an application being promoted in the advertisement. As another example, a conversion may occur when a user is shown an advertisement and the user purchases an advertised item on the advertiser's web site within a defined time period. Except where otherwise noted, click-through, conversion, or other positive engagement by a user with an advertisement is generally referred to herein as an "engagement."

The ratio of the number of conversions or engagements to the number of times an advertisement is displayed is referred to as the conversion rate. A completion rate is a ratio of a number of video ads that are displayed to completion to a number of video ads initiated on a device. In some examples, advertisers may pay for their advertisements through an advertising system in which the advertisers bid on ad placement on a cost-per-click (CPC), cost-per-mille clicks (CPM), cost-per-completed-view (CPCV), cost-per-action (CPA), and/or cost-per-install (CPI) basis. A mille represents a thousand impressions.

FIG. 1 is a block diagram of an ad server system 100 for communicating with client devices 102, 104, 106, publishers 182, and advertisers 184, in accordance with described implementations. The ad server system 100 includes an advertising engine 130, processing logic 132, device profiles 134, storage medium 136, an ad store 150, an ad builder format tool 192, and an auction system 190. The auction system 190 may be integrated with the ad server system 100 or separate from the ad server system 100. The ad server system 100 provides advertising services for advertisers 184 to client devices 102, 104, and 106 (e.g., source device, client device, mobile phone, tablet device, laptop, computer, connected or hybrid television (TV), IPTV, Internet TV, Web TV, smart TV, satellite device, satellite TV, automobile, airplane, etc.). A client device profile for a device is based on one or more parameters including location (e.g., GPS coordinates, IP address, cellular triangulation, Wi-Fi information, etc.) of the device, a social profile for a user of the device, and/or categories or types of applications installed on the device. Each client device may include respective advertising services software 103, 105, 107 (e.g., a software development kit (SDK)) that includes a set of software development tools for advertising services including in-application advertising services. The publishers 182 publish content along with selling advertisement space to advertisers. Attributers 186 may install software (e.g., software development kits of publishers) on client devices and track user interactions or engagement with publisher applications and/or advertisements. The attributers 186 may then share this user data with the ad server system 100 and the appropriate publishers 182 and advertisers 184. The ad server system 100, devices 102, 104, 106, advertisers 184, publishers 182, attributers 186, and an ad exchange 195 with third party exchange participants communicate via a network 180 (e.g., Internet, wide area network, WiMAX, satellite, etc.). The third party exchange 195 participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 5 seconds prior to an ad being played on a device, less than 1 second prior to an ad being played on a device) to provide advertising services (e.g., an in-application ad that includes a preview (e.g., video trailer) of an application, in-application advertising campaigns for brand and performance advertisers) for the devices.

In one example, an ad format builder tool 192, as discussed further below, dynamically generates and provides advertisements for insertion at an ad placement position within an application for presentation to a user via a client device. The ad format builder tool allows a publisher or developer to create a new custom advertisement campaign, associate content items of the advertisement campaign with various tokens, select templates usable for dynamic creation of advertisements, etc.

The ad format builder tool 192 provides a technological improvement to advertisers allowing them to provide content items for advertisement campaigns so that advertisements can be dynamically generated and tested to determine the best advertisement format for each user for each device, and/or for each application, and/or for each environment in which the advertisement is to be presented. Any changes or edits for any aspect of the ad format builder tool 192, such as new templates, association or adjustment of tokens with different locations in different templates, etc., are performed without needing to update advertising services software on a user's device.

In some implementations, the system 100 includes a storage medium 136 to store one or more software programs, content items, etc. Processing logic (e.g., 132) is configured to execute instructions of at least one software program to receive an advertising request from a client device 102, 104, 106. An ad request may be sent by a device upon the device having an ad play event for an initiated software application and/or upon initiation of an application in which ads may be presented. In some implementations, the ad request my identify one or more of the user that is associated with the device and/or the application executing on the device through which the advertisement is to be presented, device type, device capabilities, the access permission to various components of the device by the executing application (e.g., access to the device's camera, microphone, etc.), etc.

The processing logic is further configured to send a configuration file and/or an advertisement to the device in response to the advertising request. The configuration file may include different options for obtaining at least one advertisement ("ad") to play on the client device during an ad play event. Alternatively, or in addition thereto, the configuration file may identify an advertisement that is stored in a memory (e.g., cache) of the client device, identify an advertisement to be obtained from the ad store 150 of the ad server system 100, identify or provide a dynamically generated ad that is to be presented, and/or indicate that an advertisement is to be obtained from the exchange 195.

Figure 2:
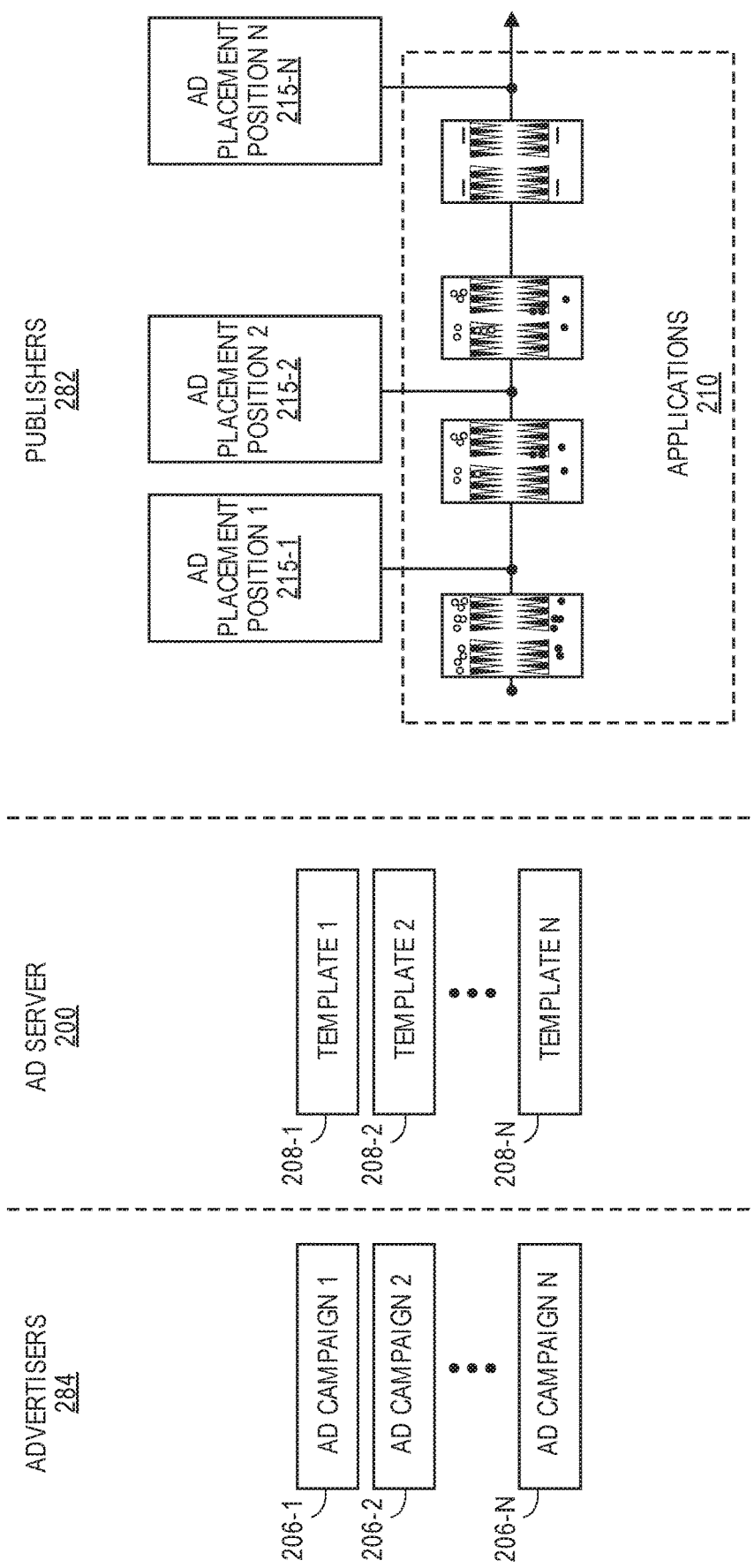
FIG. 2 is a block diagram illustrating advertising campaigns provided by advertisers, templates maintained by an ad server system, and ad placement positions within an application at which advertisements may be presented in the application, in accordance with described implementations.

FIG. 2 is a block diagram illustrating advertisement campaigns 206 provided by advertisers 284, templates 208 maintained by the ad server system 200, and ad placement positions 215 within an application at which advertisements may be presented in an application, in accordance with described implementations.

As discussed in further detail below, with the described implementations, advertisers may provide any number of ad campaigns, such as ad campaign 1 206-1, ad campaign 2 206-2 through ad campaign N 206-N, to the ad server system 200. Each ad campaign may include one or more content items, a duration of time during which the ad campaign is to be run, users or user types to which the ads of the ad campaign are to be targeted, pricing information for the ad campaign, etc. The ad campaigns may include various types of content items that may be dynamically selected in creating an advertisement. For example, an ad campaign may include an AR content item, a 3DS content item, a 3D content item, and a 2D content item, each of which may be selected for dynamic ad creation based on one or more current device characteristics, executing application permissions, user preference, etc. The type of a content item is generally referred to herein as a content type or content item type.

As the ad campaigns are provided by the advertisers 284 to the ad server system 200, the ad server system receives and stores the ad campaigns 206 in one or more data stores. As can be appreciated, any number of advertisers may provide any number of ad campaigns to the ad server system 200 and the ad server system will receive the ad campaigns and publish advertisements corresponding to those ad campaigns on behalf of the advertisers.

The ad server system 200 may, in turn, make available any number of templates, such as templates 208-1, 208-2 . . . 208-N, that may be selected by the advertisers for use by the ad server system in dynamically generating advertisements on behalf of the advertisers for presentation to users for which various ad campaigns 206 are targeted.

Publishers 282 may also identify applications 210 to the ad server system 200 and optionally indicate ad placement positions 215 within each application 210 into which the advertisements may be inserted and presented to users accessing the applications. In the illustrated example, a publisher 282 has indicated ad placement positions 215-1, 215-2 . . . 215-N in an application 210 in which advertisements may be inserted by the ad server system and presented to a user accessing the application when that user reaches that position in the application 210.

In some implementations, the publisher may also select one or more templates 208 that may be used to create advertisements for insertion at the different ad placement positions 215 and/or specify the types of advertisements that may be presented at the various ad placement positions 215. In other implementations, the ad server system 200 may determine which templates to use to create advertisements for insertion into the various ad placement positions 215 of an application.

In some implementations, the publisher may identify numerous ad placement positions that are available for presentation of advertisements and the ad server system may dynamically determine which ad placement positions to utilize for presentation of ads to users accessing the application. In some instances, the publisher may indicate a total or maximum number of advertisements and/or ad placement positions that may be utilized during each access duration by a user. Alternatively, or in addition thereto, the ad server system may determine the number of advertisements to present to the user and then select ad placement positions from available ad placement positions to use for presentation of advertisements to the user.

As discussed in more detail below, the ad server system 200, upon receiving ad campaigns 206 and indications of ad placement positions 215 within one or more applications 210 may dynamically generate an advertisement using content items of an ad campaign 206 and provide that advertisement to a client device for presentation at an ad placement position in an application 210 when a user accessing the application reaches the position within the application 201 at which the advertisement may be presented.

Figure 3:
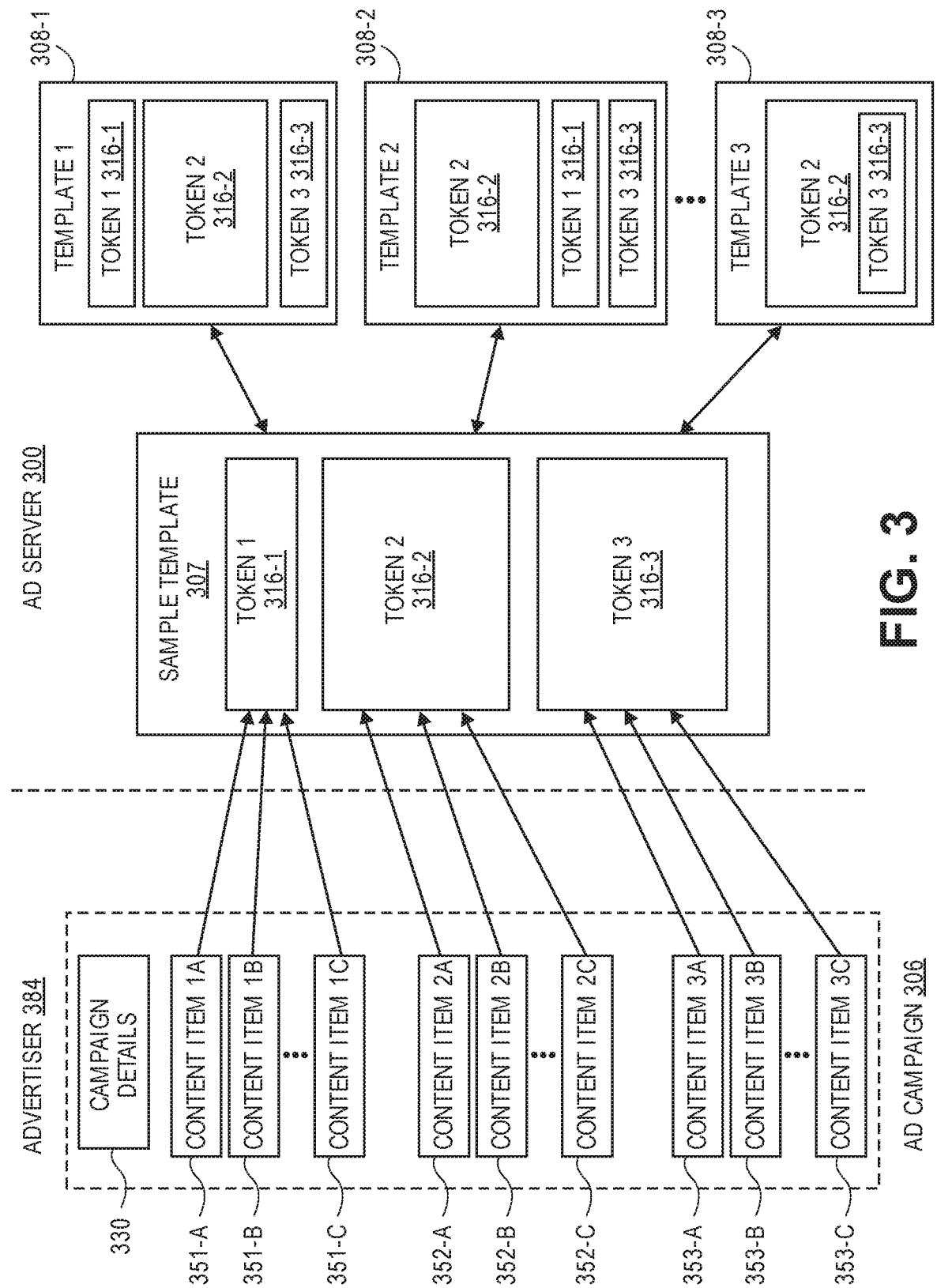
FIG. 3 is a more detailed block diagram illustrating an example ad campaign of an advertiser and templates of the ad server system, in accordance with described implementations.

FIG. 3 is a more detailed block diagram illustrating ad campaign 306 provided by an advertiser 384 and templates of the ad server system 300, in accordance with described implementations. As illustrated, an advertiser may provide an ad campaign 306 that includes campaign details 330 and one or more content items. Campaign details 330 may include, but are not limited to, start date of the campaign, end date of the campaign, target user type, desired CTR, bid pricing (e.g., CPC, CPM, CPCV, CPA, CPI, etc.), return on investment, desired action(s) in response to advertisements, desired engagement by users, etc.

In addition to the campaign details 330, the ad campaign 306 may include one or more content items. Content items may be any form or type of content item that may be reproduced by a client device and presented by the client device to a user. For example, a content item type may be AR information, 3D video, 3DS video, 2D video, audio, haptic, and/or any combination of two or more of AR information, 3D video, 3DS video, 2D video, audio, and haptic, such that the content item is presentable by a client device in any combination of AR output, visual output, audible output, and/or haptic or physical output.

In this example, the user has provided content item 1A 351-A, content item 1B 351-B, and content item 1C 351-C, all of which are of a first content item type. In comparison, content item 2A 352-A, content item 2B 352-B, and content item 2C 352-C are different content item types. For example, content item 2A 352-A is an AR content item type, content item 2B 352-B is 3D video content item type, and content item 2C 352-C is a 2D video content item type. Finally, in this example, content item 3A 353-A, content item 3B, and content item 3C 353-C, may be the same or different content item types. As will be appreciated, any number and/or combination of content items and/or content item types may be provided with an ad campaign.

The content items 351, 352, 353 are all related to the ad campaign 306 and may be used by the ad server system 300 in various combinations to dynamically generate advertisements for the ad campaign. For example, the content items 351-A, 351-B, and 351-C may all be visual content items (e.g., images) that relate to a product that is being promoted by the advertisement campaign. Each image may vary in color, content, etc., but be related to the promoted product. In comparison, content items 352, which are different content item types in this example, are each related to the ad campaign but may be selected based on the device capabilities, application device permissions, user preference, etc.

In some implementations, the advertiser 384 may associate each content item, group of content items, or content items of particular content item types with one or more templates and/or tokens, such as tokens 316-1, 316-2, and 316-3. A token may be any form of indicator or designation that may be associated with one or more content items provided by an advertiser as part of an ad campaign. Likewise, tokens may be associated with various positions within different ad templates 308 maintained by the ad server system. In the illustrated example, the advertiser is presented with a sample template 307 that includes three tokens 316-1, 316-2, and 316-3, each of the three tokens associated with a different location in the sample template 307. The advertiser may select which content items 351-A, 351-B, 351-C, 352-A, 352-B, 352-C, 353-A, 353-B, and 353-C to associate with which tokens 316-1, 316-2, and 316-3 of the sample template 307. In this example, the advertiser has associated content items 351-A, 351-B, and 351-C with token 1 316-1, associated content items 352-A, 352-B, and 352-C with token 2 316-2, and associated content items 353-A, 353-B, and 353-C with token 3 316-3. Alternatively, the advertiser may specify one type of content item for each position in the template and create different advertisements using different templates and/or content items.

In some implementations, the advertiser may simply designate content item types and the ad server system may associate the different content item types with corresponding tokens for those types of content items and/or with templates curated for those types of content items. As another example, the advertiser may designate a group of related content items that are of different content item types that are to be assigned to the same token and the ad server system may associate that group of related content items with a token that can be utilized for each content item type included in the group of related content items. For example, token 2 316-2 may be designated for a main content that can be any of AR, 3D, 3DS, or 2D video and the ad server system may associate the group of related content items 352-A, 352-B, and 352-C with token 2 316-2.

The ad server system 300 also maintains a plurality of templates that may be used by the ad server system 300 to dynamically generate ads using content items provided by the advertisers. As illustrated, the templates 308 may have different layouts to present different types and/or structures of advertisements. Each template may have a different layout, and different tokens and/or content item types may be associated with different locations within each template. For example, template 1 308-1 includes three tokens. Token 1 316-1 is positioned at an upper location of the template 308-1, token 2 316-2 is positioned at a middle location of template 1 308-1, and token 3 316-3 is at a lower location of template 1 308-1. In comparison, in template 2 308-2 token 2 316-2 is at the upper location of template 2 308-2, token 1 316-1 is at the middle location, and token 3 316-3 at a lower location of template 2 308-2. Template 3 308-3 includes two tokens, token 2 316-2 and token 3 316-3, with token 2 316-2 filling the majority of template 3 308-3 and token 3 positioned within a perimeter of token 2 316-2.

As advertisement requests are received from client devices, the ad server system dynamically generates an advertisement by selecting an appropriate template 308 and generating an advertisement corresponding to that template layout using content items provided by an advertiser and associated with tokens identified in the selected template. For tokens associated with different content item types, the ad server system may select a content item based on determined device capabilities, application permissions, and/or user preference. For example, a received advertisement request may indicate one or more current device characteristics, such as a device type, the application executing on the device through which the advertisement is to be presented along with current application permissions to device components, and/or a user identifier of the user associated with the device or the application. As discussed further below, the ad server system may utilize the received information to select an appropriate content item type and/or template for use in generating the advertisement. For example, if the ad server system 300 selects template 1 308-1 to generate an advertisement, the ad server system may select any one of content items 351-A, 351-B or 351-C, which are associated with token 1 316-1, to populate the upper location of the template associated with token 1 316-1. Likewise, if the ad server system determines that the device is capable of providing AR interaction, the application has permissions to the appropriate device components (e.g., camera), and the user is determined to prefer AR interactions, the ad server system will select content item 2A, which includes AR information to populate the middle location of the template associated with token 2 316-2. Finally, the ad server system 300 may select any one of content items 353-A, 353-B, or 353-C, which are associated with token 3 316-3, to populate the bottom location of the template associated with token 3 316-3.

As discussed further below, selection of the template and/or the content items may be based on a variety of factors, including, but not limited to, the requesting client device, device characteristics (e.g., current network connection, remaining battery level, device movement), the application in which the advertisement is to be presented, the device component access permissions of the application in which the advertisement is to be presented, a user to which the advertisement will be presented, a location of the client device, a time of day, a day of the week, a predicted access time that the user will access the application during the current access session, a machine learned model determined to be representative of the user, etc.

Upon selection of the respective content items, the ad server system generates an advertisement and sends the advertisement back to the requesting client device for presentation in the placement position for the advertisement.

Figure 4A:
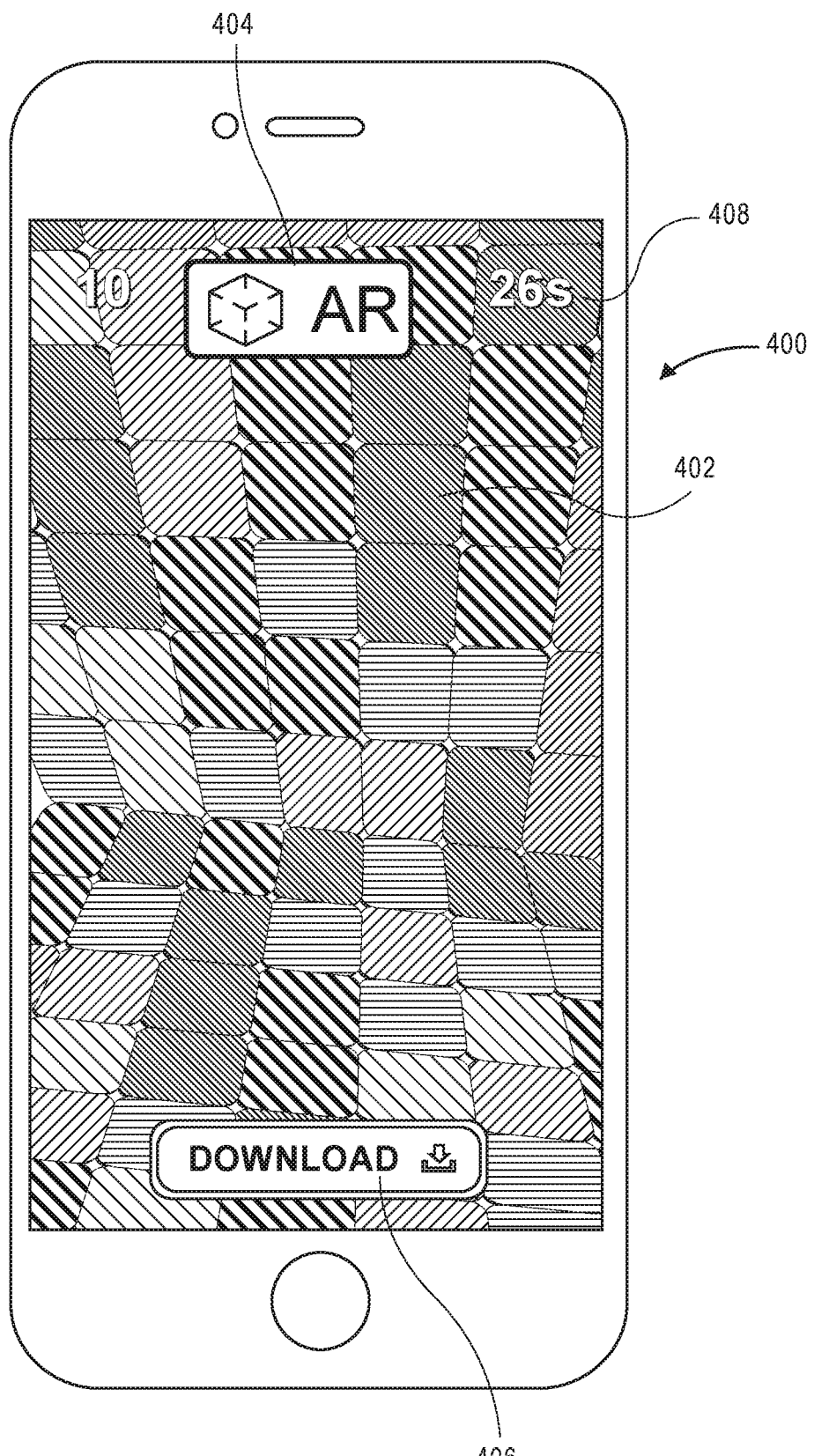
FIG. 4A is a graphical illustration of a non-augmented reality advertisement that includes an option for a user to select an AR advertisement, in accordance with described implementations.

For example, FIG. 4A is a graphical illustrations of a non-augmented reality advertisement 400 that includes an AR option 404 for a user to request an AR advertisement, in accordance with described implementations. In the illustrated example, a user may view and/or interact with aspects of the advertisement 200, such as selecting one or more blocks 402 of the advertisement. Likewise, as the advertisement may have a fixed duration before the user can resume the application in which they were operating, the advertisement 400 may include a time or time remaining indicator 408. Likewise, the user may select to download the application corresponding to the advertisement 400 through selection of the download control 406.

As discussed further below, if the user selects the AR control 404, the currently presented advertisement 400 will be removed from the display and a corresponding AR advertisement will be presented. For example, if a user selects the AR control 404, the presented advertisement 400 is removed from the presentation and the AR advertisement 450 (FIG. 4B) is presented to the user, as illustrated in FIGS. 4B-4C.

Figure 4B:
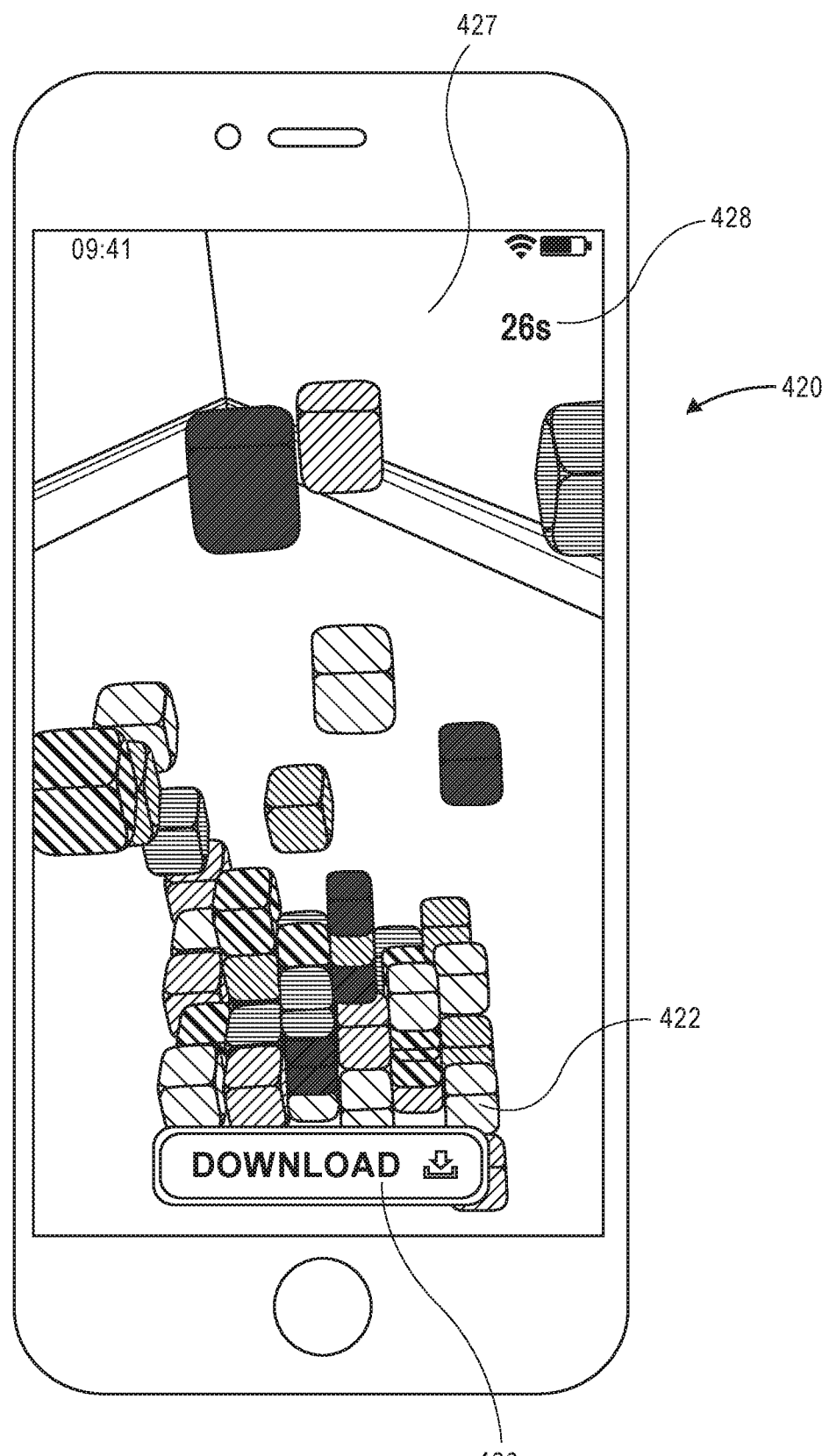
FIGS. 4B-4C are graphical illustrations of an augmented reality advertisement, in accordance with described implementations.
Figure 4C:
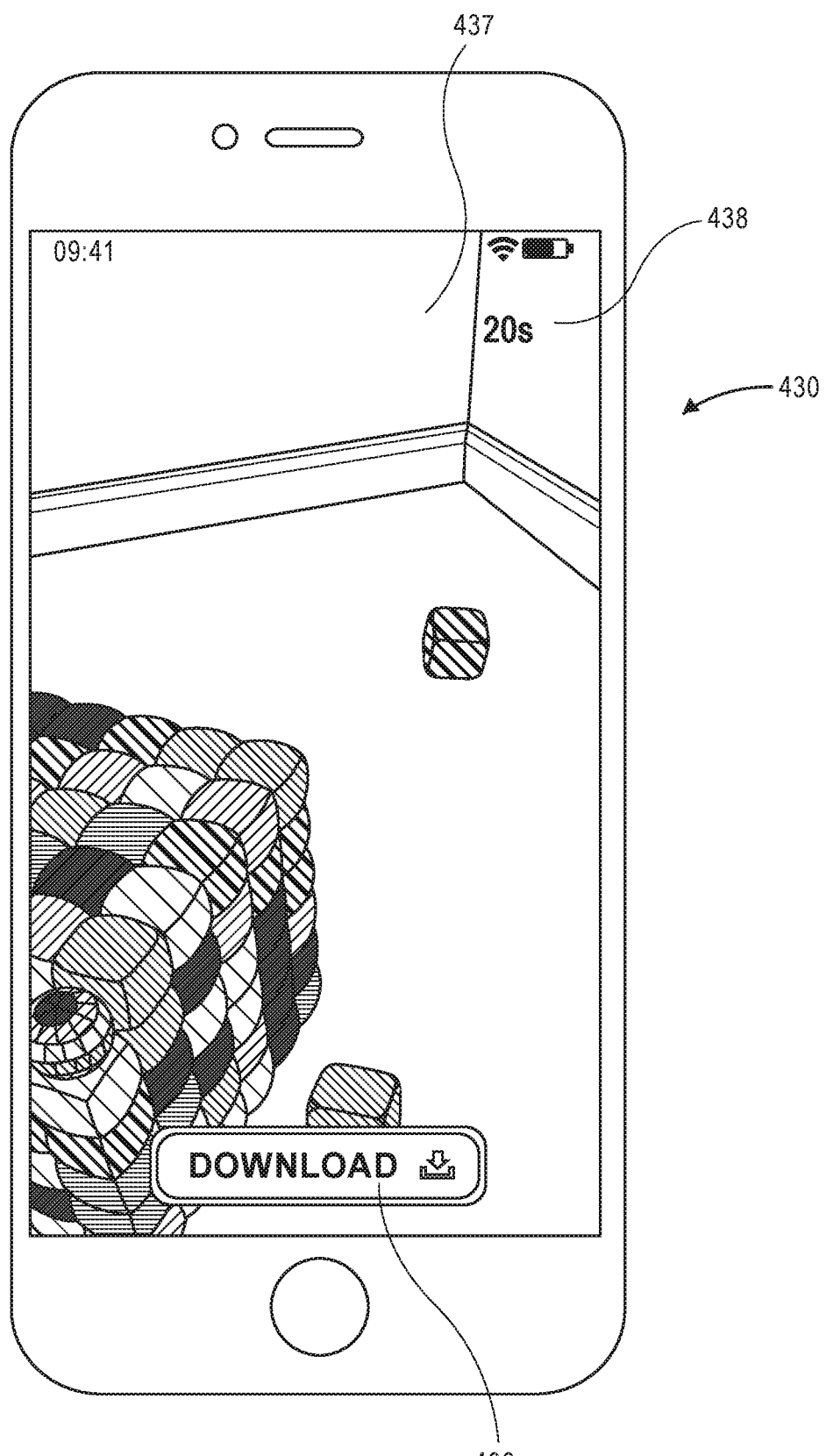

FIGS. 4B-4C are graphical illustrations of an augmented reality advertisement (420/430), in accordance with described implementations. In this example, the client device utilizes a camera (device component) of the device to render video or images of a real-world environment 427, such as the floor and walls of a room, as illustrated in FIG. 4B. The advertisement portion 422 of the AR advertisement is presented on the display and overlaid on the video to appear as if the application is part of the real world. In this example, the advertisement portion 422 includes a cube of several blocks that are positioned and appear to be sitting upon and building up from the floor of the real world environment 427.

A user may view and/or interact with the AR advertisement. In this example, a user may select one or more of the blocks of the AR portion 422 and/or physically move, or move the client device, to alter a view of the AR advertisement. For example, and referring to FIG. 4C, a user may physically move the client device and the AR advertisement 430 is updated accordingly. In this example, as the device moves, it appears as if the AR portion 432 remains in the same position on the floor of the real-world environment and the user is moving around in the real-world environment with respect to the AR portion 432. Comparing FIGS. 4B and 4C the view of the AR portion 422/432 has changed as the device moves to appear as if the user is moving around the AR portion of the advertisement, which is presented as positioned on the floor in the real-world environment 427/437. Presentation of augmented reality content is well known to those skilled in the art and will not be discussed in detail herein.

As with the non-AR advertisement of FIG. 4A, a user may select to download the application advertised by the AR advertisement through selection of the download control 426/436. Likewise, the presentation duration of the AR advertisement may be fixed in length, a time indicator 428/438 may also be presented as part of the AR advertisement.

As illustrated above, the described implementations are operable to dynamically generate a variety of advertisements for an ad campaign for presentation to a user that is accessing an application on a client device. While the above examples illustrate advertisements that include AR, video content items, digital still content items, animation content items, and interactive content items, it will be appreciated that any form of content item may be included in various advertisements and/or portions of advertisements. Likewise, while the example advertisements presented in FIGS. 4A-4C are illustrated as being presented on the entire display of the client device 430, in other implementations, templates may be utilized to dynamically generate advertisements that are less than the full display screen. For example, one or more templates may be utilized to generate advertisements that are only presented in a lower or upper portion of the display of the client device such that the application being accessed is presented in the other portion of the display and remains visible and accessible to the user.

With the examples presented herein, the ad server system provides a technological improvement over existing systems by allowing the dynamic and intelligent generation and delivery of AR interactive advertisements for presentation with devices that are capable of presenting AR information and/or to users that prefer AR interactions. In addition, as discussed further below, any number of factors may be considered at the time of advertisement creation to generate an advertisement that is specific to the content being advertised, the current device characteristics of the device receiving the advertisement, the user that is to view the advertisement, and/or the conditions or environment within which the user is going to view the advertisement, thereby increasing the potential for user engagement with the advertisement. Still further, feedback from a presented advertisement may be received to further enhance the prediction and creation of advertisements in the future for that user and/or other users.

In addition, because content items may be associated with tokens and tokens are associated with positions with various templates that are used to generate the advertisements, content items, groups of related content items of the same or different types, etc., for an ad campaign may be added and/or removed from the ad campaign and associated with the tokens, without having to recreate the advertisements for the ad campaign. For example, an advertiser may add an additional related group of content items that include content items of the AR content type, the 3D content type, and the 2D content type, associate the related group of content items with one or more tokens, and those additional content items will be incorporated into dynamically generated advertisements created by the ad server system for that ad campaign, as appropriate. Likewise, additional templates may also be created using existing tokens to further increase the variability or number of advertisements that may be generating using content items associated with those templates. Alternatively, if content items are associated directly with templates, one or more content items may be easily switched out for different content items without having to recreate the advertisement. Likewise, templates may be switched so that the same content items of an advertisement campaign may be presented in different arrangements or structures. Finally, through the use of content items, tokens, and templates, modifications to advertisements, as discussed herein, may all be done by the advertiser and/or the ad server system and may not require any modifications and/or updates to the SDK that is included in or used with the applications provided by publishers.

Figure 5:
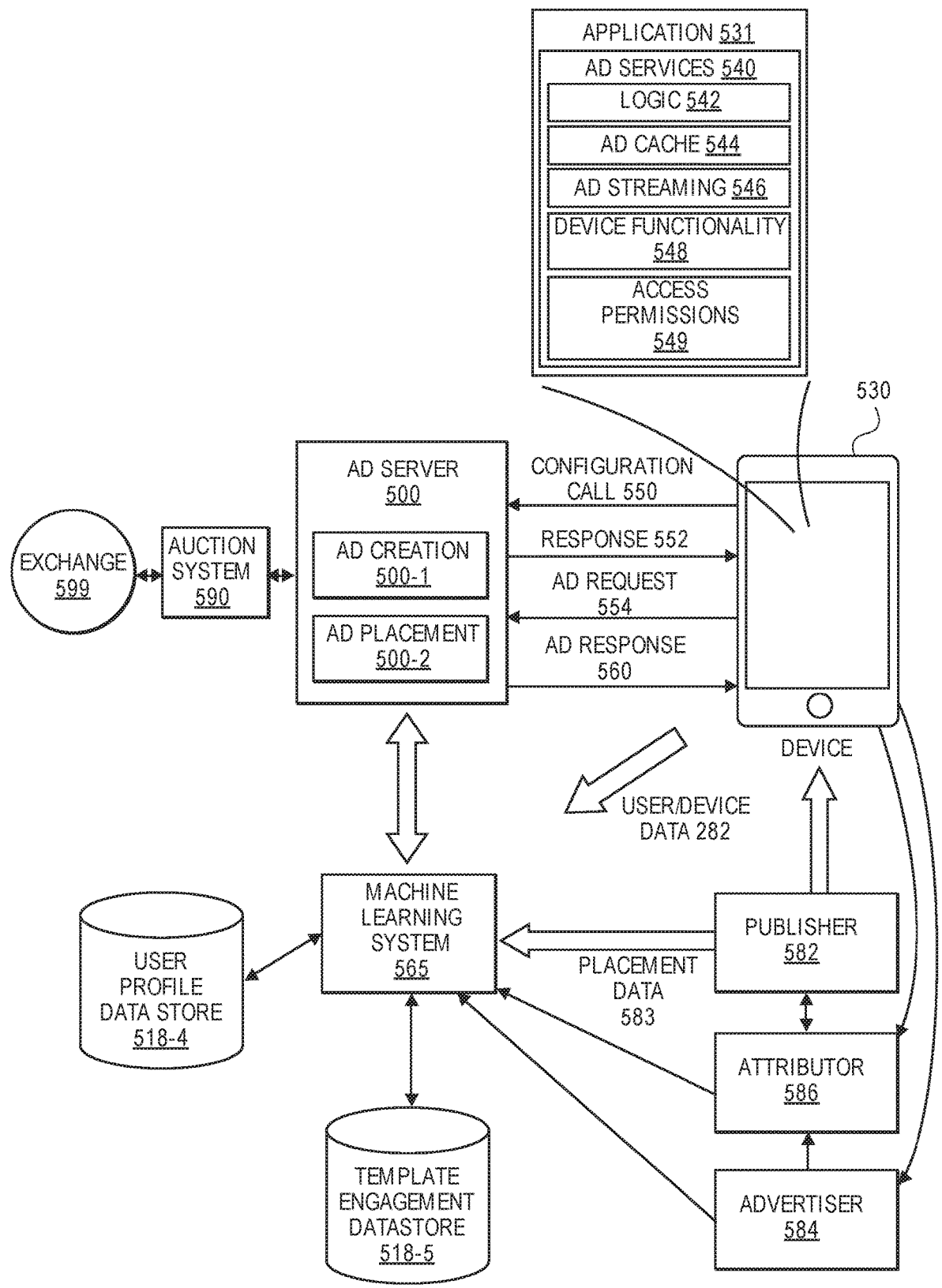
FIG. 5 is a block diagram illustrating the exchange of information between an ad server system, a client device, publishers, an advertiser, and an attributor, in accordance with described implementations.

FIG. 5 is a block diagram illustrating the exchange of information between an ad server system 500, a client device 530, publishers 582, an advertiser 584, and an attributor 586, in accordance with described implementations. In this example, a client device 530 (e.g., source device, client device, mobile phone, tablet device, laptop, computer, connected or hybrid television (TV), IPTV, Internet TV, Web TV, smart TV, etc.) initiates a software application (e.g., a mobile application, a mobile web browser application, a web based application, non-web browser application, etc.). For example, a user may select one of several software applications 531 installed on the client device. The advertising services software 540, operating on the client device 530, is also initiated upon the initiation of one of the software applications 531. The advertising services software 540 may be associated with or embedded with the software application. The advertising services software 540 may include or be associated with logic 542 (e.g., communication logic for communications such as an ad request), an ad cache store 544 for storing one or more of the dynamically generated ads provided by the ad server system 500 to the client device 530, ad streaming functionality 546 for receiving, optionally storing, and playing ads streamed from the ad server system 500, device functionality 548 for determining device and connection capabilities (e.g., type of connection (e.g., 4G LTE, 3G, Wi-Fi, WiMAX, etc.), bandwidth of connection, location of device, type of device, display characteristics (e.g., pixel density, color depth), etc.), and access permissions functionality 549 for determining the device components (e.g., gyroscope or other haptic component, camera, microphone, speaker) for which access has been enabled for the application through which the advertisement is to be presented. In other implementations, the advertising services software 540 may have direct access permissions to one or more device components in addition to or as an alternative to the access permissions of the application.

The initiated software application(s) 531 or advertising services software 540 may have an ad play event for displaying or playing an ad on the display of the device 530. At operation, the ad services 540 generates and sends to the ad server system 500 a configuration call request 550. The configuration call may include information about the user accessing the software application, client device information, application access permissions to device components, device location, and/or other information collected by the logic 542. The ad server system, in response to receiving a configuration call 550, determines options for ad play events corresponding to the software application being accessed on the client device 530 and optionally determines which of a plurality of candidate ad placement positions within the software application are to be utilized to present advertisements to the user.

The options may include, but are not limited to, options for obtaining an advertisement to present on the client device in response to an ad play event, ad placement positions that are to be utilized within the software application to present advertisements to the user, etc. In one implementation, a first option may include playing at least one ad that is cached in the ad cache memory 544 of the client device 530 during the ad play event. A second option may include planning to play at least one ad that is cached in the memory 544 on the device 530 but asking for at least one additional ad from the ad server system 500. If the ad server system generates and sends another ad in a timely manner (e.g., in time for a predicted ad play event at a selected ad placement position, within a time period set by the at least one configuration file) then the provided ad will be presented during the predicted ad play event at the ad placement position within the software application 531. Another option may include streaming at least one ad to be played during the predicted ad play event to the device 530. The configuration file can be altered by the ad server system 500 or the client device 530 without affected the advertising services software 540.

As a user is accessing the software application 531, an ad placement position at a future location within the software application that has been indicated as an ad placement position to be utilized is determined and the ad services 540 sends an ad request 554 to the ad server system 500 requesting an advertisement to present at that ad placement position. The ad server system 500, upon receiving the ad request 554, utilizes the information from the configuration file and optionally any additional information included in the ad request 554, information from the attributer 586, and/or information from the advertiser 584 to dynamically generate and send an advertisement to the client device 530 for presentation at the ad placement position in response to the ad play event.

The ad request 554 may include different types of information, including, but not limited to, publisher settings (e.g., a publisher of the selected software application), an application identifier identifying the software application 531, application access permissions to device components, user profile information, client device characteristics (e.g., device id, OS type, network connection for client device, whether client device is mobile device, volume, screen size and orientation, language setting, etc.), environmental information (e.g., geographical data, location data, motion data, such as from an accelerometer or gyroscope of the client device), language, time, application settings, demographic data for the user of the device, access duration data (e.g., how long a user has been using the selected application), and cache information. The ad server system 500 processes the ad request 554, and optionally other information to dynamically generate an advertisement that is sent to the client device as the ad response 560 for presentation at the ad placement position.

Attributers 586 may have software (e.g., an SDK of the publisher of the application) installed on the user's device and obtain third party user data from the client device. This user data may include, but is not limited to, a user's interaction and engagement with the software application, a length of time that the application is installed, an amount of purchases from the application, buying patterns in terms of which products or services are purchased and when these products or services are purchased, engagement with advertisements presented in applications, engagement with different content types of advertisements presented in applications, access duration by a user of an application, etc. As the attributor collects data from the client device, the collected data may be provided to a machine learning system 565, which may be included in the ad server system or separate from the ad server system. In some implementations, data may also or alternatively be provided directly from the client device to the machine learning system 565.

In some implementations, advertisers and/or the ad server system may also provide data to the machine learning system 565. For example, the ad server system 500 may provide information indicating the ad template, content items, content item types, and/or ad placement positions used for generating and presenting ads to a particular user in a particular application, etc. Likewise, in some implementations, publishers 582 may also provide information to the machine learning system, including, but not limited to, application information (e.g., type and/or content of the application), candidate ad placement positions, etc.

The machine learning system 565, as discussed further below, upon receiving information from the ad server system 500, device 530, publisher 582, attributors 586, and/or advertisers 584, may generate user models representative of groups of users that receive in-application advertisements from the ad server system 500. The user models may be generated based on actual user interaction and/or engagement with presented advertisements or present advertisements including particular content item types, and indicate engagement predictions for advertisements based on a combination of one or more of the device profile, application, ad placement position, user profile, content item types, and/or environment conditions.

Figure 6:
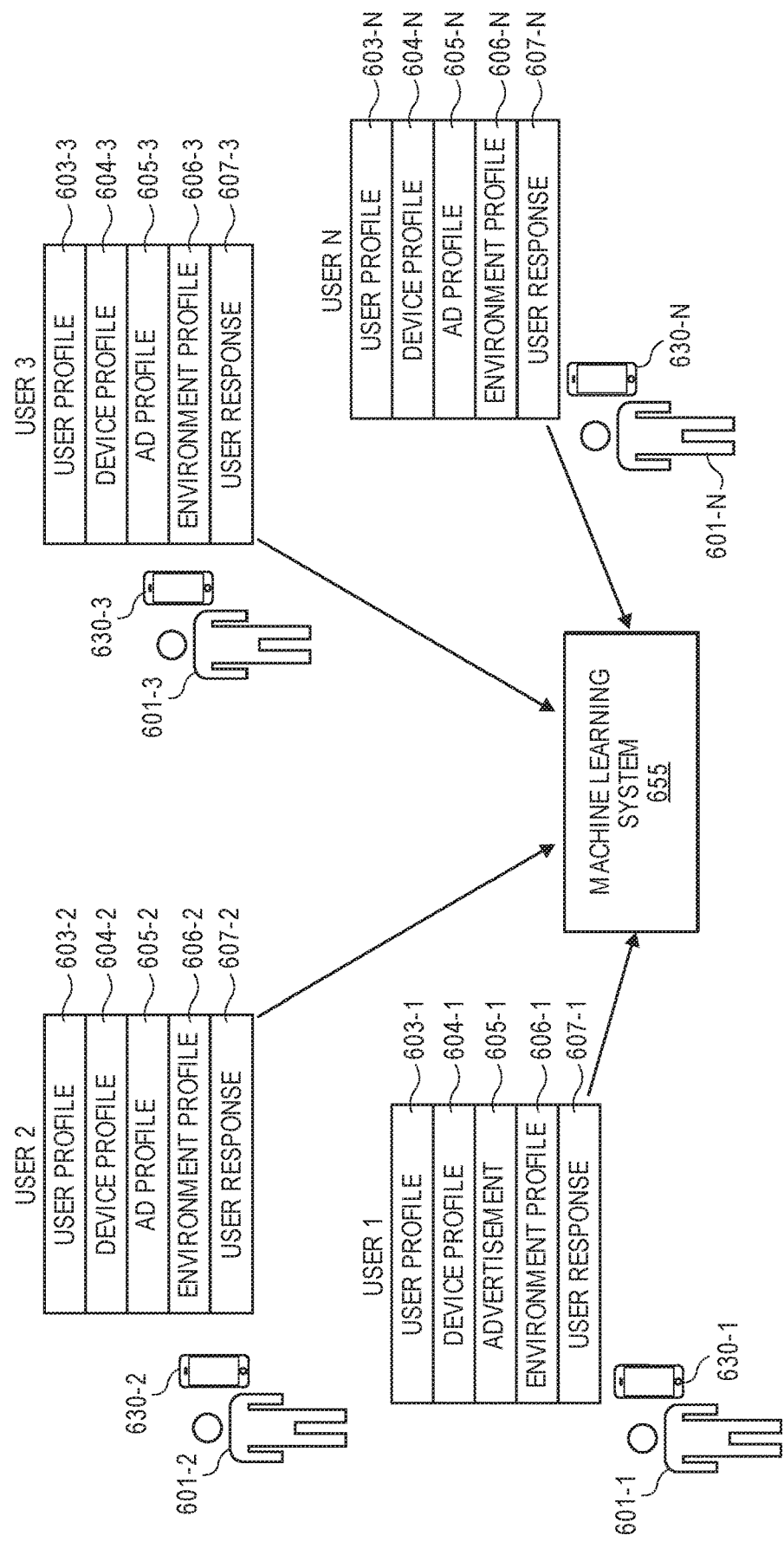
FIG. 6 is a block diagram of a machine learning system that receives user profiles, device profiles, advertisement profiles, environment profiles, and user engagement response, according to described implementations.

FIG. 6 illustrates a plurality of users 601(1), 601(2), 601(3), -601(N) that interact with applications presented on a respective client device 630(1), 630(2), 630(3), -630(N) and have corresponding user profiles 603-1, 603-2, 603-3, -603-N. As the users 601 interact with applications and/or as the ad server system discussed herein sends advertisements that are presented in-application to the users, or otherwise, the actual user response 607 or user engagement is monitored and included as part of the user profile 603 of the user. In addition, other data, generally referred to herein as conditions, may also be included in the user profile as actual conditions at the time each advertisement is presented to the user. For example, the device profile 604 (e.g., device type, orientation, connectivity, etc.), advertisement 605, or advertisement identifier, and/or the environment profile 606 (e.g., device/user location, time of day, day of week, temperature) may be maintained in each user profile as representative of the conditions during the presentation of the advertisement by the client device to the user.

For example, when user 1 601-1 is accessing an application and is presented with an advertisement, the user profile 603-1 for user 1 601-1 may be updated to include an advertisement profile 605-1 representative of the presented advertisement and the content type(s) included in the advertisement, device profile 604-1 corresponding to the device at the time of the advertisement presentation, and environment profile 606-1 corresponding to environmental conditions at the time of the advertisement presentation. In addition, an actual user response 608-1 or engagement value may likewise be determined and stored as part of the user profile 603-1 for user 1.

In a similar manner, when user 2 601-2 is accessing an application and is presented with an advertisement, the user profile 603-2 for user 2 601-2 may be updated to include an advertisement profile 605-2 representative of the presented advertisement and the content type(s) included in the advertisement, device profile 604-2 corresponding to the device at the time of the advertisement presentation, and environment profile 606-2 corresponding to environmental conditions at the time of the advertisement presentation. In addition, an actual user response 607-2 or engagement value may likewise be determined and stored as part of the user profile 603-2 for user 2. When user 3 601-3 is accessing an application, and is presented with an advertisement, the user profile 603-3 for user 3 601-3 may be updated to include an advertisement profile 605-3 representative of the presented advertisement and the content type(s) included in the advertisement, device profile 604-3 corresponding to the device at the time of the advertisement presentation, and environment profile 606-3 corresponding to environmental conditions at the time of the advertisement presentation. In addition, an actual user response 607-3 or user engagement by user 3 601-3 with the presented advertisement may likewise be determined and stored as part of the user profile 603-3 for user 3. When user N 601-N is accessing an application, and is presented with an advertisement, the user profile 603-N for user N 601-N may be updated to include an advertisement profile 605-N representative of the presented advertisement and the content type(s) included in the advertisement, device profile 604-N corresponding to the device at the time of the advertisement presentation, and environment profile 606-N corresponding to environmental conditions at the time of the advertisement presentation. In addition, an actual user response 607-N or engagement value may likewise be determined and stored as part of the user profile 603-N for user N.

As the user profiles are updated with actual information corresponding to a presented advertisement, the actual data, represented by each user profile, is provided to a machine learning system 655 as training inputs.

Because users vary in their preferences, interests, application use patterns, behaviors, etc., and those things further vary based on other conditions (e.g., time of day, day of week, time of year, location, weather, etc.), actual user behavior exhibited by users in response to advertisements presented within different applications and/or at different advertisement placement positions within applications will likewise vary. As a particular example, if an advertisement that includes a content type, such as AR information, is presented to three different users at the same advertisement placement position within the same application and under similar conditions, the user response from each user may vary. The following Table 1 illustrates example excerpts of respective user profiles, and portions of the actual user behavior for users 601(1), 601(2), and 601(3) of FIG. 6 following a presentation of an advertisement with different content types but under similar conditions. As will be appreciated, the user profiles may include fewer or additional items of information beyond that presented in this table 1.

TABLE 1

|  | USER 1 | USER 2 | USER 3 |
|---|---|---|---|
| USER PROFILE |  |  |  |
| AGE | 23 | 19 | 45 |
| GENDER | MALE | FEMALE | FEMALE |
| DEVICE PROFILE |  |  |  |
| DEVICE TYPE | PHONE A | PHONE A | PHONE A |
| AD PROFILE |  |  |  |
| AD IDENTIFIER | 1234 | 1234 | 1234 |
| ACCESS DURATION | 18 MIN. | 22 MIN. | 15 MIN. |
| AD PLACEMENT POSITION | PLACEMENT 1 | PLACEMENT 1 | PLACEMENT 1 |
| CONTENT TYPE(S) | AR | 3DS | 2D |
| CONDITIONS |  |  |  |
| LOCATION | 48.282; −122.231 | 33.653; −96.636 | 39.482; −106.038 |
| WEATHER | CLEAR | CLEAR | CLEAR |
| TEMPERATURE | 18 | 23 | 17 |
| DATE | Aug. 4, 2018 | Aug. 4, 2018 | Aug. 4, 2018 |
| TIME | 12:30:00 | 14:25:34 | 22:22:22 |
| USER RESPONSE |  |  |  |
| ENGAGEMENT | CLICK-THROUGH | CLICK-THROUGH | APP. CLOSE |

As illustrated, user response may vary based on any one or more of a variety of factors present at the time of presentation of the advertisement to different users and/or based on the content type of the content included in the advertisement. These different responses may be due to different interests, preferences, desires, conditions, etc., of the different users.

In accordance with the present disclosure, the user profile information, such as that illustrated in Table 1 may be provided as inputs to a machine learning system 655, either in real time or in near-real time, as the data is collected in response to presented advertisements. Returning to FIG. 6, the details of each user profile 603 of each of the users 601(1), 601(2), 601(3), -601(N) at the time an advertisement is presented may be provided to the machine learning system 655, as a set of training inputs, and the actual user response 607 or engagement value that is exhibited by each of the users 601 in response to the advertisements under those conditions is provided to the machine learning system 655 as a set of training outputs corresponding to each user profile 603.

The machine learning system 655 may be fully trained using a substantial corpus of user profiles, advertisements, and actual user responses (engagement values) to those advertisements to develop user models for different user profiles and to correlate user profiles with the developed user models. For example, some users may have similar user profiles and produce similar responses to an advertisement presented under similar conditions with similar content types. Such types of users may be correlated and associated with a user model by the machine learning system 655 and utilized as representative of users having user profiles that are similar. After the machine learning system 655 has been trained, and the user models developed, the machine learning system may be provided with a user profile, current conditions, application information, ad placement position information, and a device profile, and the machine learning system will generate engagement predictions for different combinations of templates, content items, and content types for the ad campaign. The ad server system may then select a template and combination of content items and content types that has the highest probability of engagement from that user under those conditions. As discussed below, in some implementations, it may first be determined the content types that may be presented on the device.

Training of the machine learning system may include thousands or millions of user profiles, conditions, advertisements, content types, etc., and actual user engagement values in response to presented advertisements from different advertisement campaigns.

Figure 7:
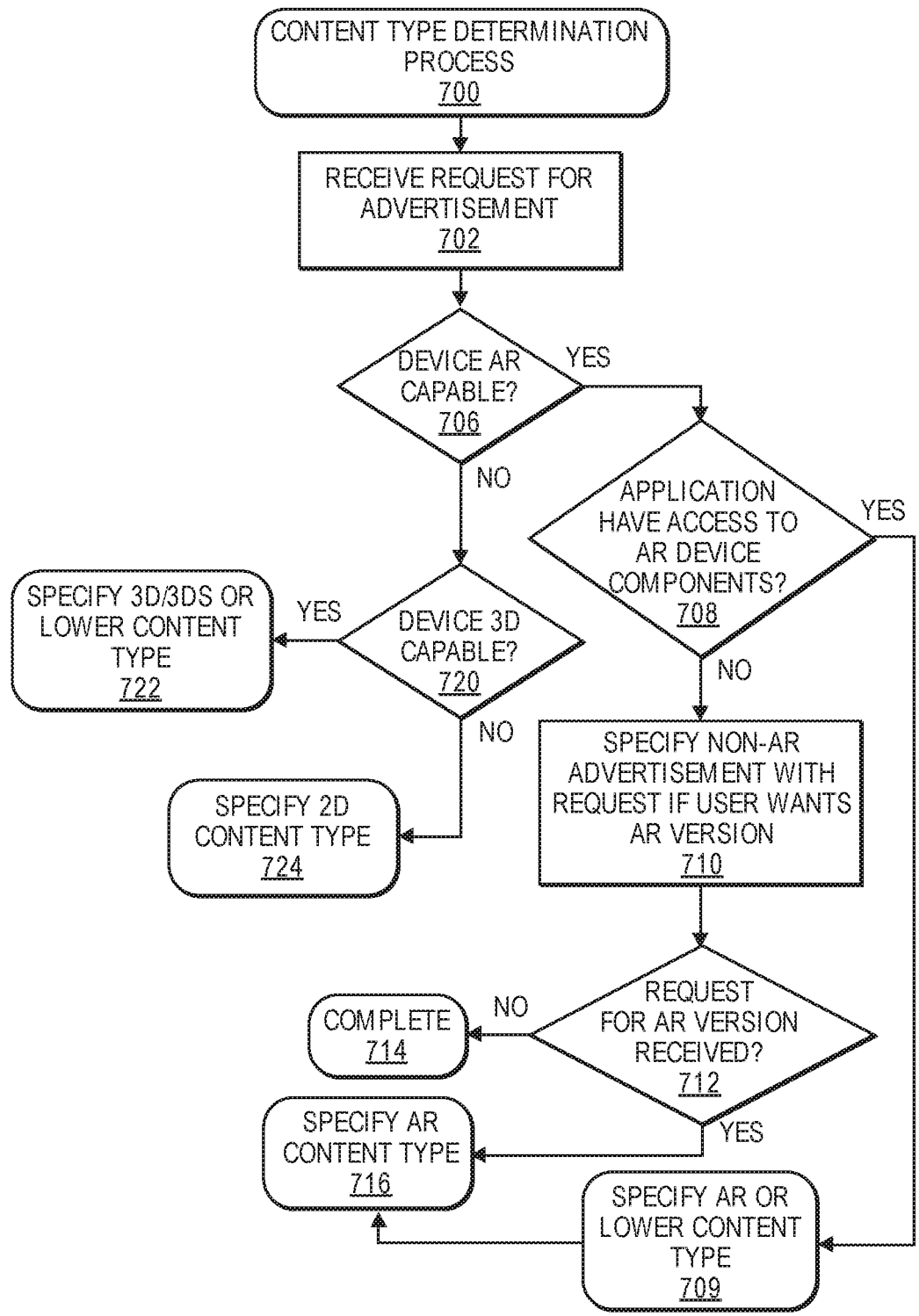
FIG. 7 is an example content type determination process, in accordance with described implementations.

FIG. 7 is an example content type determination process 700, in accordance with described implementations. The example process initiates upon receipt from a client device or an application executing on a client device, a request for an advertisement, as in 702.

In response to receiving the request, a determination is made as to whether the device that is to present the advertisement is capable of presenting AR content, as in 706. For example, if the device does not have a camera or other input that is capable of generating images of the real-world for augmentation, it may be determined that the device is not capable to present AR content. As another example, if the device is a stationary or fixed device (e.g., television), even though it may have a camera it may be determined that the device is not AR capable because user interaction with or movement of the device is limited.

If it is determined that the device is AR capable, a determination is made as to whether the application executing on the AR device has access permissions to device components necessary for providing an AR experience (e.g., microphone, speaker, camera, haptics), as in 708. In some implementations, access permissions may be included in the received advertisement request. In other examples, access permissions may be determined or maintained on an application by application basis. For example, if an application has previously presented an AR advertisement, the example process may maintain information indicating that the application has the access permissions to components needed for the AR advertisement. In some implementations, this information may be again verified prior to the AR advertisement being delivered and/or presented. If it is determined that the application does have access permissions to the necessary device components, an AR content or lower content type may be specified as available for ad creation, as in 709.

If it is determined that the application does not have access to necessary device components, the example process 700 specifies that a non-AR content type (e.g., 3D or 2D content type) advertisement is to be generated for presentation along with a request as to whether the user desires to receive the AR version of the advertisement, as in 710. By providing a non-AR content type advertisement along with a request, the user may be presented with the advertisement without the application or advertisement asking for permission to access the device components necessary for an AR advertisement. In addition, if the user desires to receive the AR version of the advertisement, the user may request to do so, and as part of the request, provide permission to access the necessary components of the device.

A determination may then be made as to whether a request for the AR version of the advertisement has been received, as in 712. If it is determined that the request for the AR version has been received, the AR content type is specified for creation of an AR advertisement, as in 716. In comparison, if it is determined that a request for AR content has not been received, the example process completes, as in 714.

Returning to decision block 706, if it is determined that the device is not capable of presenting AR content, a determination is made as to whether the device is capable of presenting 3D or 3DS content, as in 820. If it is determined that the device is capable of presenting 3D or 3DS content, the example process specifies that 3D/3DS or lower type of content type is to be included in the generated advertisement, as in 822. However, if it is determined at decision block 820 that the device is not 3D or 3DS capable, the example process specifies that an advertisement with 2D content be generated for presentation, as in 824.

Figure 8:
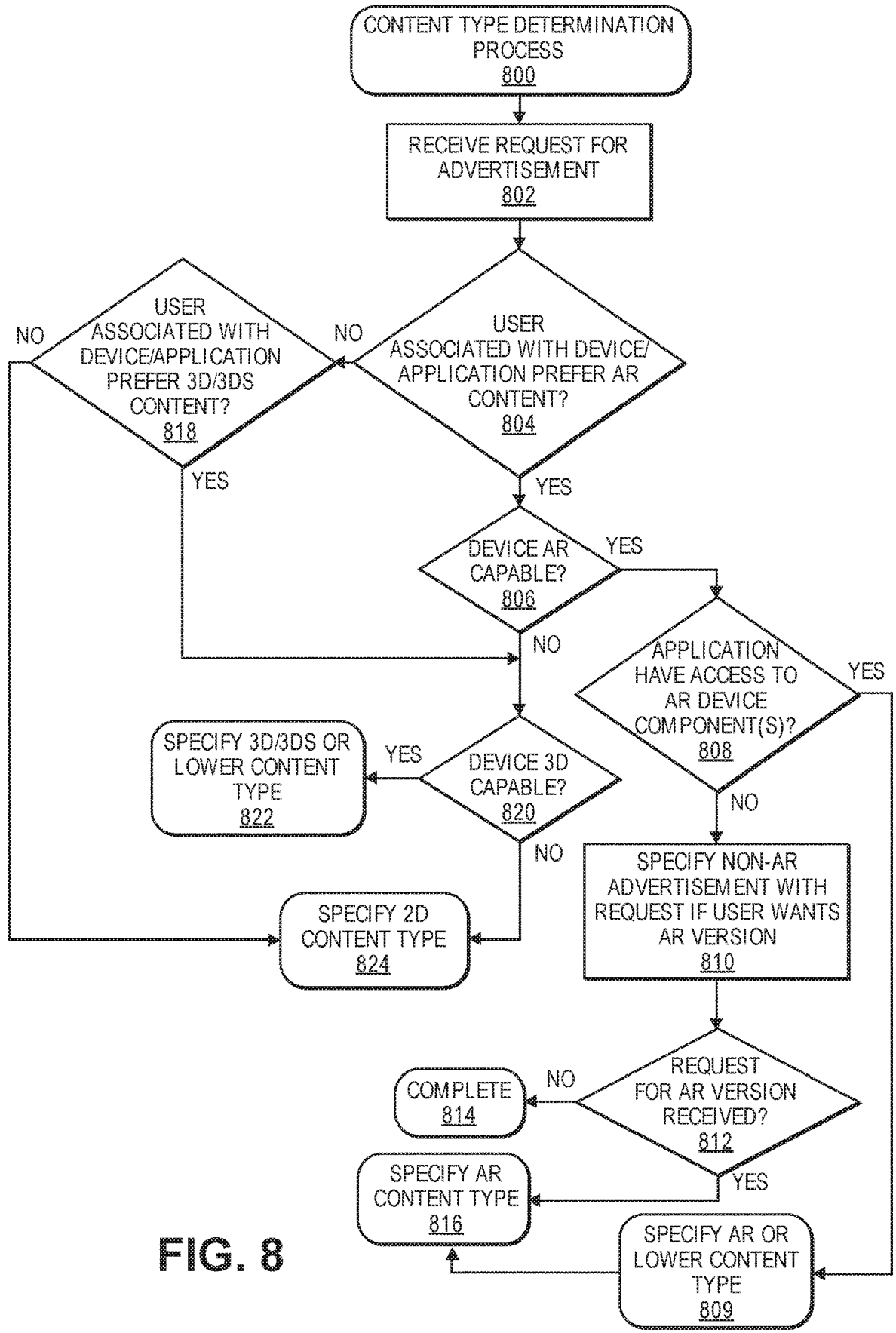
FIG. 8 is another example content type determination process, in accordance with described implementations.

FIG. 8 is another example content type determination process 800, in accordance with described implementations. The example process initiates upon receipt from a client device or an application executing on a client device, a request for an advertisement, as in 802.

In response to receiving the request, a determination is made as to whether the user associated with the device and/or associated with the application executing on the device through which the advertisement is to be presented, prefers to receive AR content, as in 804. As discussed above, the advertisement request may include an indication or identifier of a user profile and/or a device identifier which may be utilized to determine an associated user. The user profile may then be used to determine directly the user preference toward AR content, based on historical interactions with the user and/or content delivered to and/or engaged with by the user. Alternatively, or in addition thereto, the user profile may be provided as an input to the above-discussed trained machine learning system to determine a potential preference by the user for receiving AR content.

If it is determined that the user prefers to receive AR content, a determination is made as to whether the device that is to present the advertisement is capable of presenting AR content, as in 806. For example, if the device does not have a camera or other input that is capable of generating images of the real-world for augmentation, it may be determined that the device is not capable to present AR content. As another example, if the device is a stationary or fixed device (e.g., television), even though it may have a camera it may be determined that the device is not AR capable because user interaction with or movement of the device is limited.

If it is determined that the device is AR capable, a determination is made as to whether the application executing on the AR device has access permissions to device components necessary for providing an AR experience (e.g., microphone, speaker, camera, haptics). In some implementations, access permissions may be included in the received advertisement request. In other examples, access permissions may be determined or maintained on an application by application basis. For example, if an application has previously presented an AR advertisement, the example process may maintain information indicating that the application has the access permissions to components needed for the AR advertisement. In some implementations, this information may be again verified prior to the AR advertisement being delivered and/or presented. If it is determined that the application does have access permissions to the necessary device components, an AR content or lower content type may be specified as available for ad creation, as in 809.

If it is determined that the application does not have access to necessary device components, the example process 800 specifies that a non-AR content type (e.g., 3D or 2D content type) advertisement is to be generated for presentation along with a request as to whether the user desires to receive the AR version of the advertisement, as in 810. By providing a non-AR content type advertisement along with a request, the user may be presented with the advertisement without the application or advertisement asking for permission to access the device components necessary for an AR advertisement. In addition, if the user desires to receive the AR version of the advertisement, the user may request to do so, and as part of the request, provide permission to access the necessary components of the device.

A determination may then be made as to whether a request for the AR version of the advertisement has been received, as in 812. If it is determined that the request for the AR version has been received, the AR content type is specified for creation of an AR advertisement, as in 816. In comparison, if it is determined that a request for AR content has not been received, the example process completes, as in 814.

Returning to decision block 804, if it is determined that the user associated with the device or the application does not prefer AR content, a determination is made as to whether the user associated with the device or the application prefers 3D or 3DS content, as in 818. If it is determined that the user prefers 3D or 3DS content, or if it is determined at decision block 806 that the device is not capable of presenting AR content, a determination is made as to whether the device is capable of presenting 3D or 3DS content, as in 820. If it is determined that the device is capable of presenting 3D or 3DS content, the example process specifies that 3D/3DS or lower type of content type is to be included in the generated advertisement, as in 822. However, if it is determined at decision block 818 that the user does not prefer 3D or 3DS content or if it is determined at decision block 820 that the device is not 3D or 3DS capable, the example process specifies that an advertisement with 2D content be generated for presentation, as in 824.

Figure 9:
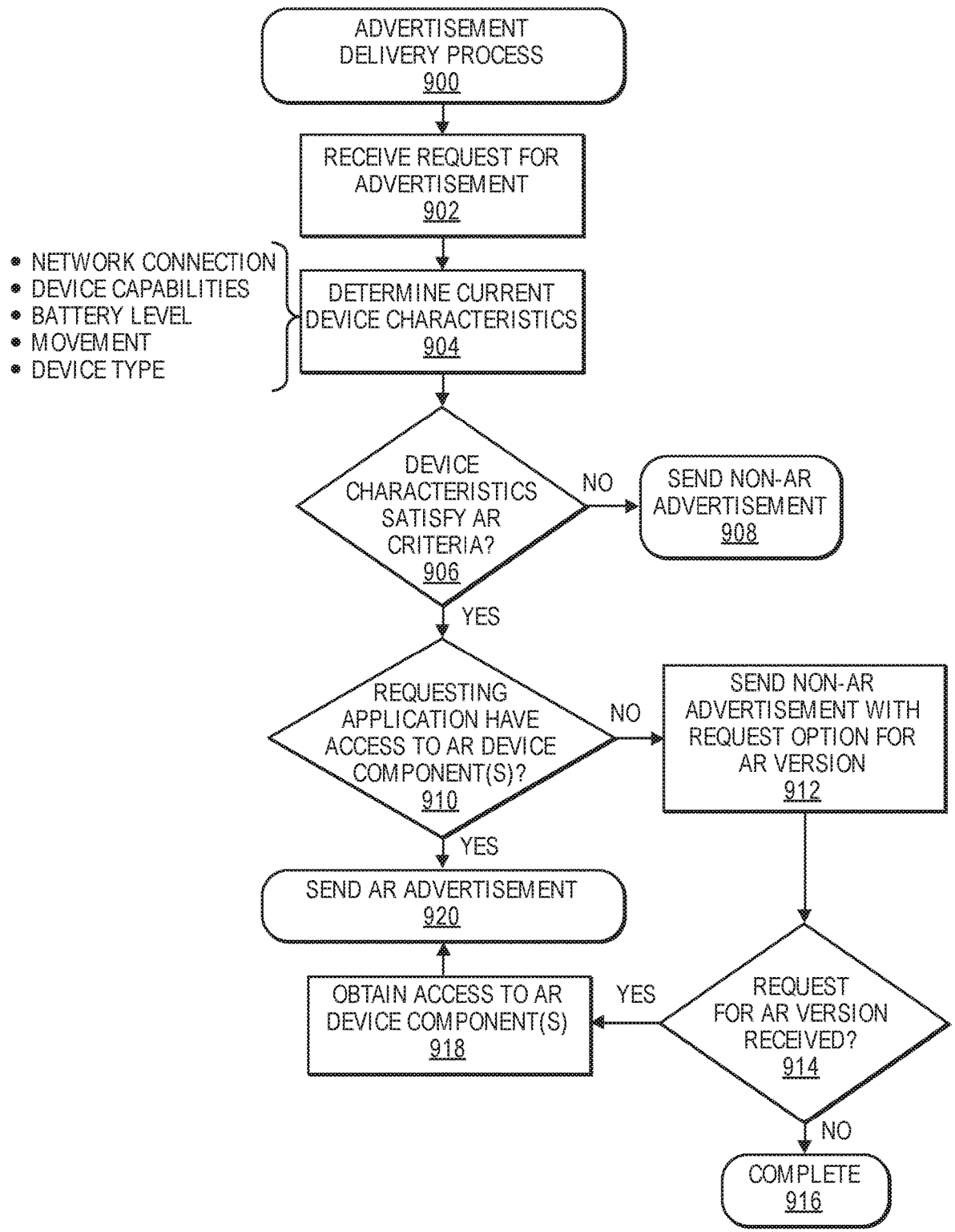
FIG. 9 is an example advertisement delivery process, in accordance with described implementations.

FIG. 9 is an example advertisement delivery process, in accordance with described implementations. Like example processes 700 and 800, the example process 900 begins upon receipt from a client device or an application executing on a client device, a request for an advertisement, as in 902.

In response to receiving the request, current device characteristics of the requesting device are determined, as in 904. As discussed above, device characteristics may include, but are not limited to, the type and/or strength of the current network connection of the device, the device capabilities and/or configuration, the current device battery level or power level, whether the device is or has been moving, the type of device, the available memory of the device, the device operating system, etc. In some implementations, device characteristics may be included in the received advertisement request. In other implementations, device characteristics may be provided or determined by the example process 900 through other communications.

A determination is then made as to whether the determined device characteristics satisfy an AR criteria, as in 906. An AR criteria may be a criteria that is to be satisfied before an AR advertisement is considered for delivery to and presentation by the device. The AR criteria may be specific to the AR advertisement type, the device, the device type, the user of the device, etc. AR criteria may consider, for example, one or more current device characteristics. For example, AR criteria may require that the device be connected to a Wi-Fi network and have at least thirty-percent remaining battery level before the example process 900 will consider sending an AR advertisement to the device.

If it is determined that the current device characteristics do not satisfy the AR criteria, the example process 900 sends a non-AR advertisement to the device in response to the advertisement request, as in 908. The non-AR advertisement may be any form of advertisement, including, but not limited to, video, 3D, still images, audio, text, etc.

If it is determined that the current device characteristics do satisfy the AR criteria, a determination is made as to whether the requesting application has access to the AR components of the device, as in 910. AR components may be, but are not limited to, the device camera, microphone, gyroscope, accelerometer, compass, etc. In some implementations, if the device has access to some AR components (e.g., camera) but not other AR components (e.g., compass), the example process 900 may only consider AR advertisements that utilize the components to which the application has access. In other implementations, the example process 900 may require that all AR components are accessible.

If it is determined that the application does not have access to AR components, the example process 900 sends a non-AR advertisement with a request that is selectable by the user to receive the AR version of the advertisement, as in 914. For example, referring back to FIG. 4A, FIG. 4A illustrates a non-AR advertisement 400 that includes a control 404 that is selectable by the user to obtain the AR version of the advertisement.

After sending the non-AR advertisement with the request option for the AR version of the advertisement, a determination is made as to whether a request for the AR version has been received from the device, as in 914. If a request is not received, the example process 900 completes, as in 916. If a request is received, a prompt is provided to the user of the device to obtain access to the AR components, as in 918, and the AR advertisement is sent to the device for presentation to the user, as in 920.

Referring back to decision block 910, if it is determined that the requesting application does have access to the AR device component(s), the AR advertisement is sent to the device for presentation to the user, as in 920.

In some implementations, the example process 900 may be performed each time a request for an advertisement is received. In other implementations, once the example process 900 has completed for an application, subsequent requests for advertisements may be processed and advertisements (AR advertisements or non-AR advertisements) generated and provided for presentation within the application without having to again determine whether the device is able to generate AR content and/or whether the application has access to AR device components. For example, if it has already been determined that the device is capable of presenting AR content and it has already been determined that the application has access to AR device components, the example process 900 may, in response to a subsequent advertisement request, generate an send an AR advertisement, without again verifying the device capabilities and/or the application device component permissions. In some implementations, the example process 900 may again verify that the requesting application still has access permissions to the relevant AR device components. Likewise, the current device characteristics may again be verified to satisfy the AR criteria.

In still other examples, if the example process 900 has been performed for a device and/or an application executing on the device and a non-AR advertisement with a selectable request option sent for presentation, but a selection of the request option has not been received, it may be determined that AR advertisements are not preferred. In such an example, further advertisement requests will be non-AR advertisements that do not include a selection option to obtain an AR version of the advertisement. In such an example, the option may be removed after any number of non-AR advertisements with the selectable option have been presented without the option selected to receive the AR version of the advertisement. Likewise, such a decision may be made for all applications executing or that may execute on the client device or only for the application through which the advertisement request(s) have been received.

Figure 10:
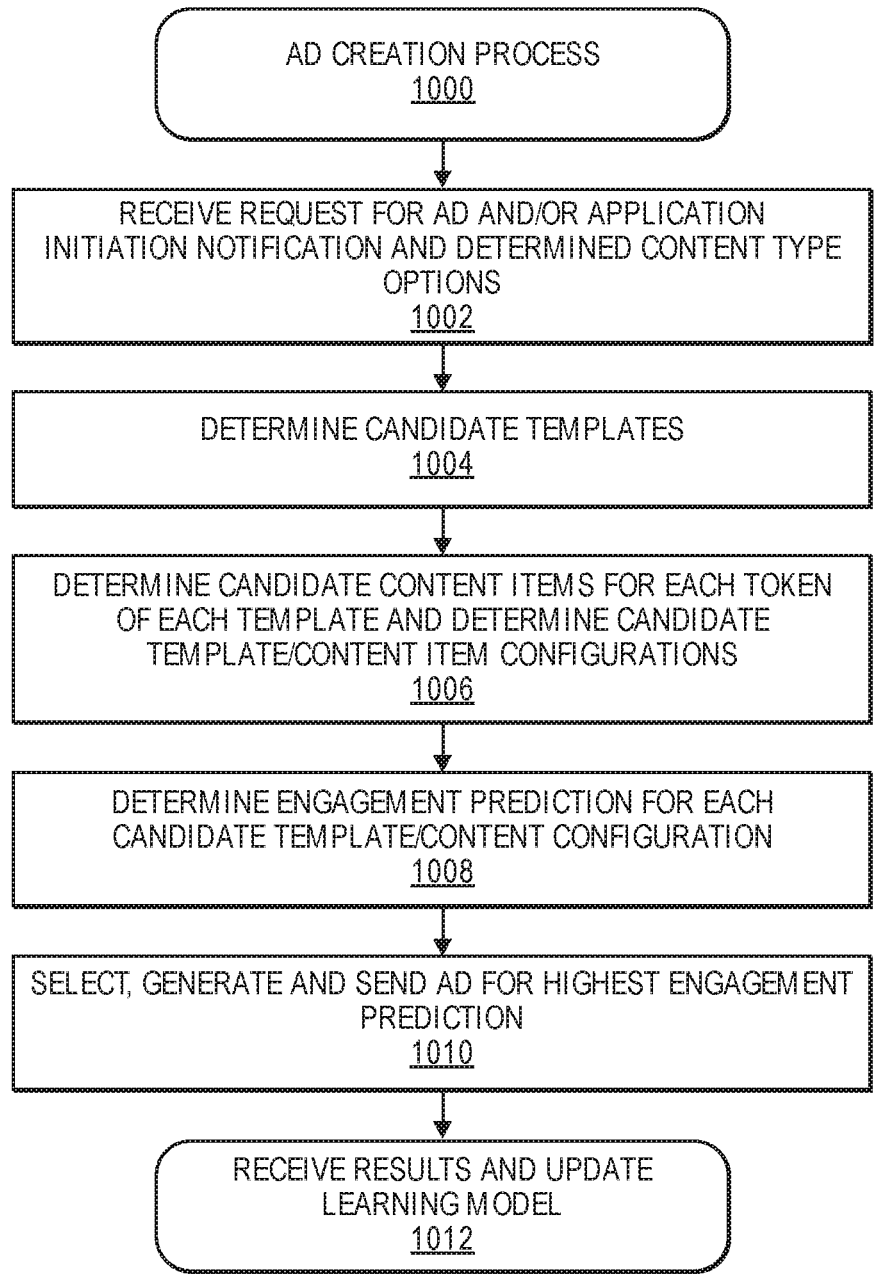
FIG. 10 is an example advertisement creation process, in accordance with described implementations.

FIG. 10 is an example advertisement creation process 1000, in accordance with described implementations. The example process initiates upon receipt from a client device or an application executing on a client device, a request for an advertisement and/or of an application initiation notification, as in 1002. For example, in some implementations, when an application is initiated for which advertisements are to be provided for presentation to a user, a notification of the application initiation may be sent to the example process 1000. Alternatively, or in addition thereto, in anticipation of an ad placement position being reached for which an ad is to be presented, a request for an advertisement may be sent to the example process 1000. In addition to receiving the request or notification from the device, an indication of content type(s) that may be used in the generated advertisement, as determined from the example process 700/800 (FIG. 7 or 8) are received.

Upon receipt of the request and/or notification, and the content type options, one or more candidate ad templates that may be used to generate an advertisement to send in response to the request or notification are determined, as in 1004. As discussed above, a variety of factors may be considered in determining ad templates that may be used to create an advertisement. For example, a machine learned user model may be selected that corresponds with one or more of a user profile of a user to which the advertisement is to be presented, a device profile to which the advertisement is to be sent, an application genre of the application requesting the device, an advertisement genre of the advertisement, the time of day, the day of the week, the time of year, the weather, the location of the device, and/or other conditions existing or expected to exist at the time of ad presentation. Other factors may include the application, application type, and/or application content in which the advertisement is to be presented, and/or the advertisement campaign that is to be used. In other implementations, the candidate template may be selected independent of the advertising campaign and upon selection of candidate templates, advertising campaigns that include content items associates with each of the tokens of one or more of the candidate templates may be considered.

For each candidate template, candidate content items and content types for each token of the template are determined and candidate template/content item configurations are determined, as in 1006. Each candidate template/content item configuration represents a unique configuration of content items associated with the various tokens of the candidate template. As such, for each candidate template, utilizing the rule of products or multiplication principal, there will be "n" number of candidate template/content item configurations, where n is the product of the number of content items associated with each template of the candidate token. For example, if there are three tokens in a candidate template and there are two content items having a specified content type associated with each token, there will be eight candidate template/content item configurations (2*2*2).

As discussed above, candidate templates include one or more tokens and one or more content items of an ad campaign may be associated with each token. The content items associated with a token may be of the same or different content types. In addition, the content items may be from the same or different advertisement campaigns. However, each candidate template/content item configuration will be specific to each advertisement campaign (i.e., a candidate template/content item configuration will not include content items from different advertisement campaigns). In some implementations, there may be content items of a content type associated with a token that do not correspond with the specified content types that may be used in generating the advertisement. In such an example, those content items will not be considered by the example process 1000 in generating the advertisement. For example, a token may be associated with a content item that is a 2D video, a content item that is a 3D video, and a content item that includes AR information. If the specified content type is 3D video or lower (e.g., 2D video), the content item that includes AR information will not be considered in the example process 1000.

In some implementations, rather than selecting candidate templates and determining candidate content items for each token of each template, candidate content items of the specified content type(s) may first be selected and then candidate templates that are linked to those content items (e.g., via tokens) may be determined. In such an example, the candidate content items are selected, then candidate templates are selected that may be used to present one or more of those content items, and then candidate template/content item configurations are determined that will produce advertisements that include the candidate content items presented according to one of the candidate templates.

In still other implementations, a template may be selected based on whether the advertisement is to a non-AR type advertisement or an AR type advertisement and an advertisement generated accordingly.

For each candidate template/content item configuration and/or candidate advertisement, an engagement prediction is determined, as in 1008. The engagement predication may be determined based on, for example, a machine learned user model that is selected based on one or more of the user profile, device profile, application, and/or environmental conditions. As discussed above, the user model may be developed based on actual user behavior under similar conditions and utilized with the current conditions and candidate template/content item configuration to predict a level of engagement if an advertisement created according to the candidate template/content item configuration is generated and presented to the user.

Based on the determined predictions, a candidate item template/content item configuration is selected that has the highest prediction and an advertisement is generated based on the template and content items corresponding to the selected candidate template/content item configuration, as in 1010. In addition, the generated advertisement is sent to the mobile device as a response to the ad request or notification of the application initiation. Alternatively, a candidate advertisement that has the highest prediction is selected as the advertisement that is to be send in response to the advertisement request.

At some time after sending the advertisement, the example process may receive results indicating actual engagement by the user with the presented advertisement, as in 1012. The results may then be used to update the user model by providing those results to the machine learning system as further input into the machine learning system for development of user models. By providing actual feedback into the machine learning system, the user models may be continuously or periodically updated with additional actual information, thereby improving future predictions relating to different candidate template/content item configurations.

Figure 11:
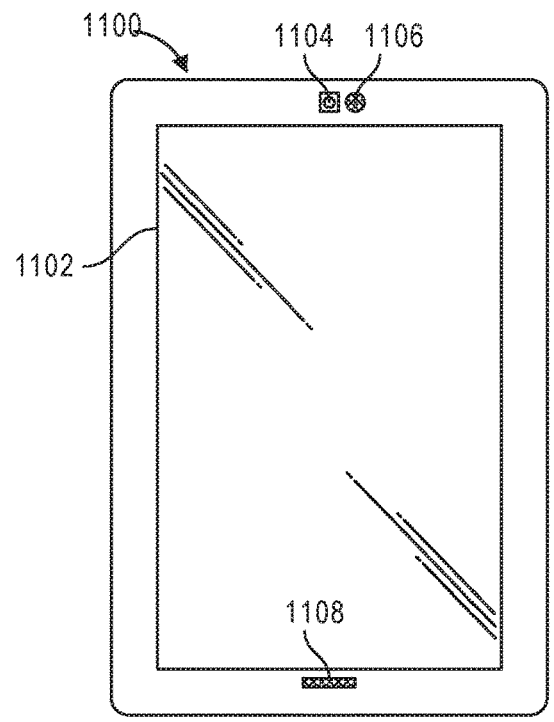
FIG. 11 illustrates an example computing device, according to an implementation.

FIG. 11 illustrates an example client device 1100 that can be used in accordance with various implementations described herein. In this example, the client device 1100 includes a display 1102 and optionally at least one input component 1104, such as a camera, on a same and/or opposite side of the device as the display 1102. The client device 1100 may also include an audio transducer, such as a speaker 1106, and optionally a microphone 1108. Generally, the client device 1100 may have any form of input/output components that allow a user to interact with the client device 1100. For example, the various input components for enabling user interaction with the device may include a touch-based display 1102 (e.g., resistive, capacitive), camera, microphone, global positioning system (GPS), compass, accelerometer, or any combination thereof. One or more of these input components may be included on a device or otherwise in communication with the device. Various other input components and combinations of input components can be used as well within the scope of the various implementations as should be apparent in light of the teachings and suggestions contained herein.

Figure 12:
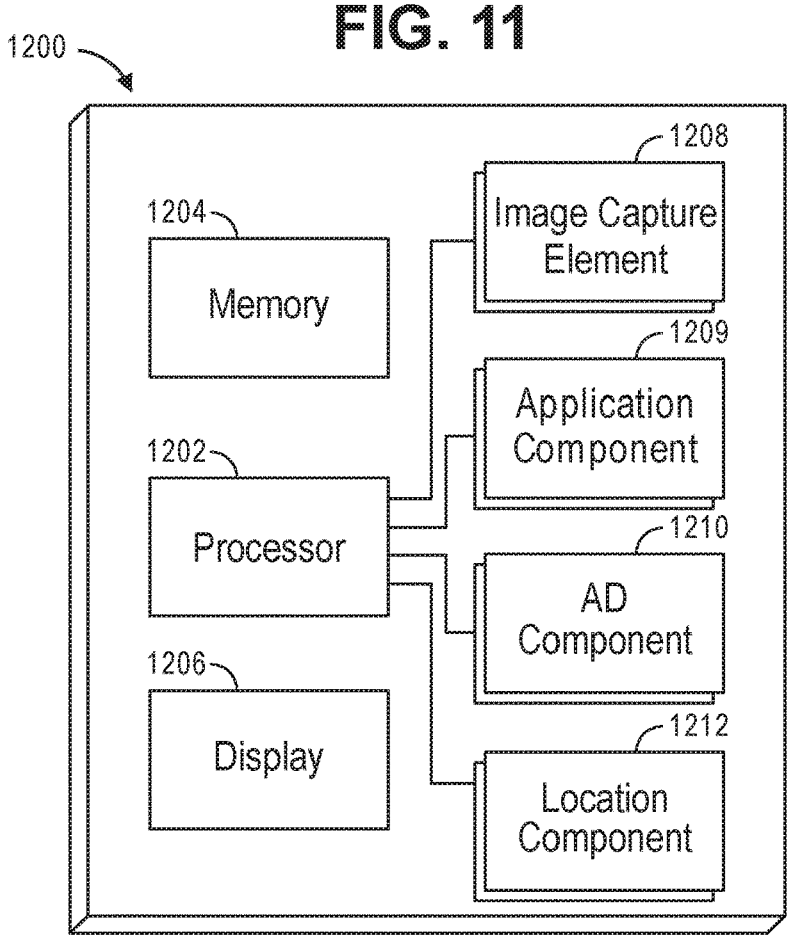
FIG. 12 illustrates an example configuration of components of a computing device, such as that illustrated in FIG. 11.

In order to provide the various functionality described herein, FIG. 12 illustrates an example set of basic components 1200 of a client device 1100, such as the client device 1100 described with respect to FIG. 11 and discussed herein. In this example, the device includes at least one central processor 1202 for executing instructions that can be stored in at least one memory device or element 1204. As would be apparent to one of ordinary skill in the art, the device can include many types of memory, data storage or computer-readable storage media, such as a first data storage for program instruction for execution by the processor 1202. Removable storage memory can be available for sharing information with other devices, etc. The device typically will include some type of display 1206, such as a touch-based display, electronic ink (e-ink), organic light emitting diode (OLED), or liquid crystal display (LCD).

The device in many implementations will include at least one image capture element 1208, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one ad component 1210 for performing the process of sending ad requests and/or application initiation notifications, providing user and/or device information, etc. For example, the client device may be in constant or intermittent communication with a remote computing resource and may exchange information, such as selected advertisements, client device information, user information, application information, engagement information, conditions, etc. The device may also include an application component 1209 that enables execution and/or monitoring of applications executing on the device. In some implementations, the application component 1209 may collect usage information about applications and provide that information to the ad server system, the machine learning system, advertisers, attributers, etc.

The device also can include at least one location component 1212, such as GPS, NFC location tracking or Wi-Fi location monitoring. Location information obtained by the location component 1212 may be used with the various implementations discussed herein as a factor in generating advertisements, determining appropriate user models to use with the described implementations, etc.

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations.

Figure 13:
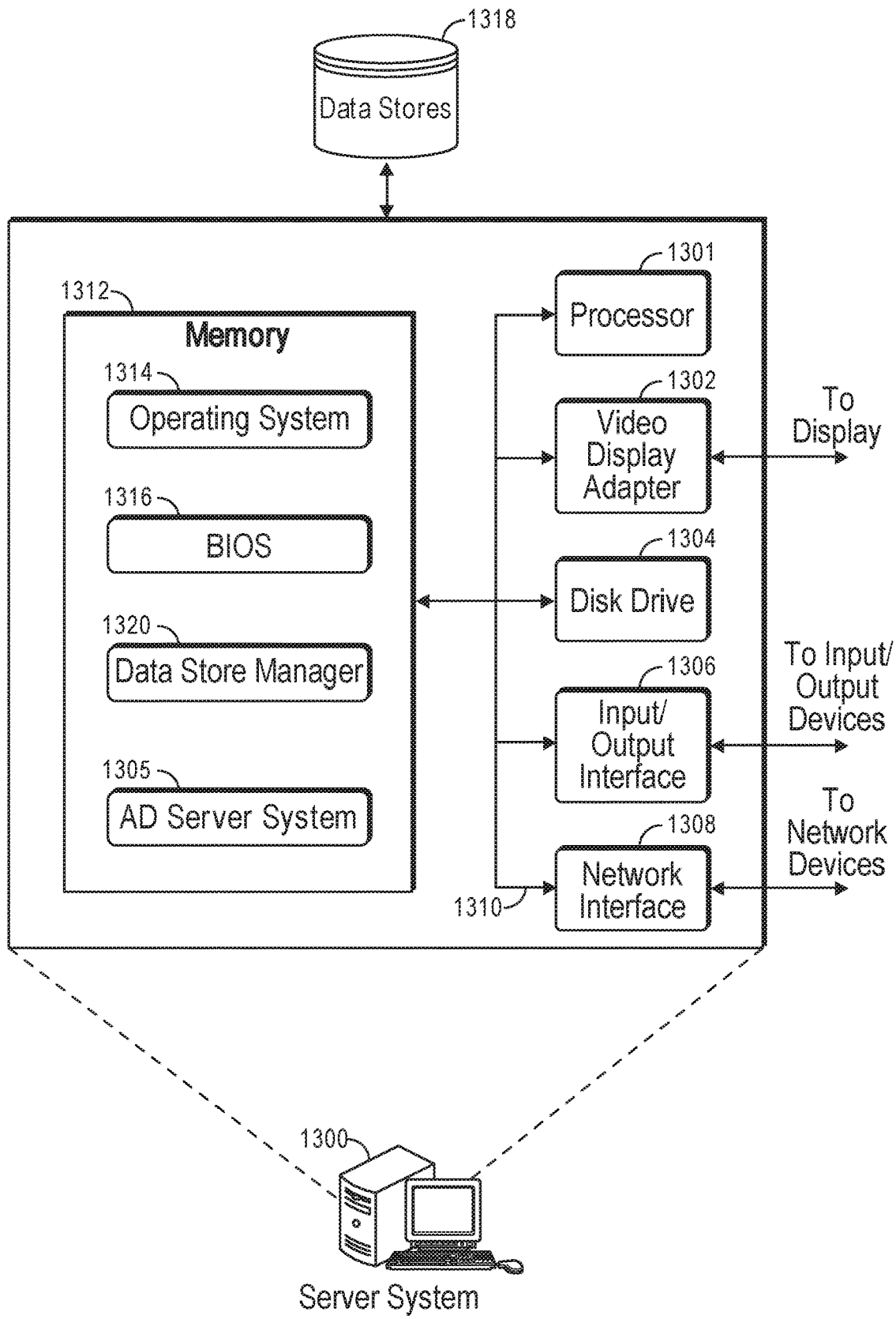
FIG. 13 is a pictorial diagram of an illustrative implementation of a server system that may be used for various implementations.

FIG. 13 is a pictorial diagram of an illustrative implementation of a server system 1300, such as a remote computing resource, that may be used with one or more of the implementations described herein. The server system 1300 may include a processor 1301, such as one or more redundant processors, a video display adapter 1302, a disk drive 1304, an input/output interface 1306, a network interface 1308, and a memory 1312. The processor 1301, the video display adapter 1302, the disk drive 1304, the input/output interface 1306, the network interface 1308, and the memory 1312 may be communicatively coupled to each other by a communication bus 1310.

The video display adapter 1302 provides display signals to a local display permitting an operator of the server system 1300 to monitor and configure operation of the server system 1300. The input/output interface 1306 likewise communicates with external input/output devices, such as a mouse, keyboard, scanner, or other input and output devices that can be operated by an operator of the server system 1300. The network interface 1308 includes hardware, software, or any combination thereof, to communicate with other computing devices. For example, the network interface 1308 may be configured to provide communications between the server system 1300 and other computing devices, such as the client device 1100.

The memory 1312 generally comprises random access memory (RAM), read-only memory (ROM), flash memory, and/or other volatile or permanent memory. The memory 1312 is shown storing an operating system 1314 for controlling the operation of the server system 1300. A binary input/output system (BIOS) 1316 for controlling the low-level operation of the server system 1300 is also stored in the memory 1312.

The memory 1312 additionally stores program code and data for providing network services that allow client devices 1100 and external sources to exchange information and data files with the server system 1300. The memory also stores a data store manager application 1320 to facilitate data exchange and mapping between the data store 1318, ad server system 1305, client devices, such as the client device 1100, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 1300 can include any appropriate hardware and software for integrating with the data store 1318 as needed to execute aspects of one or more applications for the client device 1100, the external sources and/or the ad server system 1305. The server system 1300 provides access control services in cooperation with the data store 1318 and is able to generate content such as advertisements.

The data store 1318 can include several separate data tables, databases or other data storage mechanisms and media for storing data relating to a particular aspect. For example, the data store 1318 illustrated includes content items for advertisement campaigns and corresponding metadata (e.g., tokens, indexes) about those items. Templates, user profiles, machine learned user models, and other information may likewise be stored in the data store.

It should be understood that there can be many other aspects that may be stored in the data store 1318, which can be stored in any of the above listed mechanisms as appropriate or in additional mechanisms of any of the data stores. The data store 1318 may be operable, through logic associated therewith, to receive instructions from the server system 1300 and obtain, update or otherwise process data in response thereto.

The memory 1312 may also include the ad server system 1305. The ad server system 1305 may be executable by the processor 1301 to implement one or more of the functions of the server system 1300. In one implementation, the ad server system 1305 may represent instructions embodied in one or more software programs stored in the memory 1312. In another implementation, the ad server system 1305 can represent hardware, software instructions, or a combination thereof. The ad server system 1305 may perform some or all of the implementations discussed herein, alone or in combination with other devices, such as the client device 1100.

The server system 1300, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction in FIG. 13 should be taken as being illustrative in nature and not limiting to the scope of the disclosure.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the art should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer implemented method, comprising:
receiving, from a first application executing on a client device, a first request for a first advertisement that is to be presented by the client device through the first application, wherein the first request includes a plurality of current device characteristics of the client device;
determining, based at least in part on the plurality of current device characteristics:
that the client device is capable of presenting augmented reality ("AR") advertisements; and
that an AR criteria is satisfied for the client device, wherein the AR criteria considers at least one of a power level of the client device or a network connection type of the client device;
determining that the first application does not have access permission to a camera of the client device for use in presenting AR advertisements;
in response to determining that the client device is capable of presenting AR advertisements, that the AR criteria is satisfied, and that the first application does not have access permission to the camera, sending, for presentation through the first application and by the client device, a first non-AR version of the first advertisement that includes a first selection option request to receive a first AR version of the first advertisement;

subsequent to sending the first non-AR version of the first advertisement, receiving a first selection of the first selectable option request;

in response to receiving the first selection, sending, for presentation through the first application and by the client device, a first AR version of the first advertisement that includes a first AR content;

receiving, from a second application executing on the client device, a second request for a second advertisement that is to be presented by the client device through the second application;

determining that the second application does not have access permission to the camera of the client device for use in presenting AR content; and in response to determining that the client device is capable of presenting AR content, that the AR criteria is satisfied, and that the second application does not have access permission to the camera, sending for presentation by the client device, a second non-AR version of the second advertisement with a second selectable option request to receive a second AR version of the second advertisement.

2. The computer implemented method of claim 1, further comprising:
subsequent to sending the second non-AR version of the second advertisement, receiving, from the second application, a second selection of the second selectable option request;

in response to receiving the second selection of the second selectable option request:
causing a prompt to be generated requesting access permission by the second application to the camera; and sending, for presentation through the second application and by the client device, a second AR version of the second advertisement.

3. The computer implemented method of claim 1, wherein the AR criteria further considers at least one of a movement of the client device or a client device type.

4. The computer implemented method of claim 1, further comprising:
receiving, from a third application executing on a second client device, a third request for a third advertisement that is to be presented by the second client device through the third application, wherein the third request includes a second current device characteristic of the second client device;

determining, based at least in part on the second current device characteristic, that the second client device is not capable of presenting AR advertisements; and in response to determining that the second client device is not capable of presenting AR advertisements, sending for presentation through the third application and by the second client device, a third non-AR version of the third advertisement.

5. The computer implemented method of claim 1, further comprising:
determining a plurality of engagement predictions for each of a plurality of different combinations of ad templates, content items, and content types for an advertisement; and generating, based at least in part on a combination of ad templates, content items, and content types having a highest engagement prediction, the first AR version of the first advertisement.

6. The computer implemented method of claim 5, wherein the plurality of engagement predictions are determined with a machine learning system and based at least in part on one or more of a user profile of a user of the client device, a current condition corresponding to the client device, an application information of the first application, an ad placement position information within the first application, or a device profile of the client device provided to the machine learning system.

7. A computing system, comprising:
one or more processors; and
memory storing program instructions that when executed by the one or more processors cause the one or more processors to at least:
receive a first indication of a first application executing on a client device;
determine that an augmented reality ("AR") criteria is satisfied for the client device, wherein the AR criteria considers at least one of a power level of the client device or a network connection type of the client device;
determine at least one of a user profile associated with a user executing the first application or a client device profile;
determine, based at least in part on the user profile or the client device profile, that the user prefers to receive AR content;
in response to a determination that the user prefers to receive AR content, determine that the client device is capable of presenting AR content;
in response to a determination that the client device is capable of presenting AR content, determine that the first application does not have access permissions to at least one device component of the client device that is to be used in presenting AR content;
in response to a determination that the first application does not have access permissions to the at least one device component of the client device that is to be used in presenting AR content and that the AR criteria is satisfied:
generate a first non-AR version of a first advertisement that includes a first selection option request to receive a first AR version of the first advertisement; and
send the first non-AR version of the first advertisement for presentation in the first application at an advertisement placement within the first application;
subsequent to sending the first non-AR version of the first advertisement, receive a first selection of the first selectable option request;
in response to receiving the first selection, send, for presentation by the client device, a first AR version of the first advertisement that includes a first AR content receive a second indication of a second application executing on the client device;
determine that the second application does not have access permission to the at least one device component of the client device for use in presenting AR content; and
in response to determining that the client device is capable of presenting AR content, that the AR criteria is satisfied, and that the second application does not have access permission to the at least one device component, send for presentation by the client device, a second non-AR version of a second advertisement with a second selectable option request to receive a second AR version of the second advertisement.

8. The computing system of claim 7, wherein the program instructions when executed by the one or more processors further cause the one or more processors to at least:
   determine that a second selection of the second selectable option request to receive the second AR version of the second advertisement has been received;
   obtain access permission to the at least one device component of the client device that is to be used in presenting AR content; and
   send, for presentation on the client device, the second AR version of the second advertisement that includes AR content.

9. The computing system of claim 7, wherein the program instructions when executed by the one or more processors further cause the one or more processors to at least:
   determine a plurality of content items each having a different content type that may be used in generating the first advertisement; and
   generate the first AR version of the first advertisement that includes a content item of a content type based at least in part on the determination that the client device is capable of presenting AR content.

10. The computing system of claim 7, wherein:
   the first indication includes a plurality of current device characteristics of the client device; and
   the plurality of current device characteristics include at least one of the power level of the client device or the network connection type of the client device.

11. The computing system of claim 10, wherein the AR criteria further considers at least one of a movement of the client device, or a client device type.

12. The computing system of claim 7, wherein the program instructions when executed by the one or more processors further cause the one or more processors to at least:
   receive, from a third application executing on a second client device, a third request for a third advertisement that is to be presented by the second client device through the third application, wherein the third request includes a second current device characteristic of the second client device;
   determine, based at least in part on the second current device characteristic, that the second client device is capable of presenting AR content; and
   in response to a determination that the second client device is capable of presenting AR content, sending for presentation through the third application and by the second client device, the third advertisement that includes AR content.

13. The computing system of claim 7, wherein the program instructions when executed by the one or more processors further cause the one or more processors to at least:
   determine, based at least in part on one or more of an application genre of the first application, a user preference, a location of the client device, a time of day, a day of week, a time of year, or a weather at the location, the first advertisement.

14. The computing system of claim 7, wherein the AR content of the first AR version of the first advertisement is interactive.

15. The computing system of claim 7, wherein the program instructions when executed by the one or more processors further cause the one or more processors to at least:
   determine a plurality of engagement predictions for each of a plurality of different combinations of ad templates, content items, and content types for an advertisement; and
   generate, based at least in part on a combination of ad templates, content items, and content types having a highest engagement prediction, the first AR version of the first advertisement.

16. The computing system of claim 15, wherein the plurality of engagement predictions are determined with a machine learning system and based at least in part on one or more of the user profile of the user of the client device, a current condition corresponding to the client device, an application information of the first application, an ad placement position information within the first application, or a device profile of the client device provided to the machine learning system.

17. A computer implemented method, comprising:
   determining that a first advertisement is to be sent to a client device for presentation within a first application executing on the client device;
   determining that the client device is capable of presenting augmented reality ("AR") content;
   determining, based at least in part on one or more of a power level of the client device or a network connection type of the client device, that an AR criteria is satisfied for the client device;
   determining that the first application does not have access permission to at least one component of the client device for use in presenting AR content;
   in response to determining that the client device is capable of presenting AR content that the AR criteria is satisfied, but that the first application does not have access permission to the at least one component, sending a first non-AR version of the first advertisement that includes a first selectable option request to receive a first AR version of the first advertisement;
   subsequent to sending the first non-AR version of the first advertisement, receiving a first selection of the first selectable option request;
   in response to receiving the first selection, sending, for presentation through the first application and by the client device, a first AR version of the first advertisement that includes a first AR content;
   receiving, from a second application executing on the client device, a second request for a second advertisement that is to be presented by the client device through the second application;
   determining that the second application does not have access permission to at least one component of the client device for use in presenting AR content; and
   in response to determining that the client device is capable of presenting AR content, that the AR criteria is satisfied, but that the second application does not have access permission to the at least one component, sending for presentation by the client device, a second non-AR version of the second advertisement with a second selectable option request to receive a second AR version of the second advertisement.

18. The computer implemented method of claim 17, further comprising:
   in response to receiving the first selection, obtaining access permission to the at least one component.

19. The computer implemented method of claim 17, wherein the at least one component is at least one of a camera, a compass, a gyroscope, or an accelerometer.

20. The computer implemented method of claim 17, further comprising:
- subsequent to sending the first AR version of the first advertisement, determining that a third advertisement is to be sent to the client device for presentation within the first application; and
- in response to determining that the third advertisement is to be sent,
  - sending, for presentation through the first application and by the client device, a third AR version of the third advertisement that includes AR content.

* * * * *